US012801937B2

(12) United States Patent
Fokoue-Nkoutche et al.

(10) Patent No.: US 12,801,937 B2
(45) Date of Patent: Nov. 17, 2026

(54) NAME-INVARIANT GRAPH NEURAL REPRESENTATIONS FOR AUTOMATED THEOREM PROVING

(71) Applicant: International Business Machines Corporation, Armonk, NY (US)

(72) Inventors: Achille Belly Fokoue-Nkoutche, White Plains, NY (US); Ibrahim Abdelaziz, Tarrytown, NY (US); Maxwell Crouse, Chicago, IL (US); Shajith Ikbal Mohamed, Chennai (IN); Akihiro Kishimoto, Tokyo (JP); Guilherme Augusto Ferreira Lima, Sao Paulo (BR); Ndivhuwo Makondo, Pretoria (ZA); Radu Marinescu, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 615 days.

(21) Appl. No.: 18/352,725

(22) Filed: Jul. 14, 2023

(65) Prior Publication Data

US 2025/0021830 A1 Jan. 16, 2025

(51) Int. Cl.
*G06N 5/01* (2023.01)
*G06N 3/04* (2023.01)

(52) U.S. Cl.
CPC ............... *G06N 5/013* (2023.01); *G06N 3/04* (2013.01)

(58) Field of Classification Search
None
See application file for complete search history.

(56) References Cited

U.S. PATENT DOCUMENTS 6,343,376 B1 * 1/2002 Saxe .................... G06F 11/3608 706/14
6,813,615 B1 11/2004 Colasani et al.
(Continued)

FOREIGN PATENT DOCUMENTS

CN 107220709 A 9/2017
CN 110909868 A 3/2020
(Continued)

OTHER PUBLICATIONS

Wang et al., Premise Selection for Theorem Proving by Deep Graph Embedding, 2017, In Proceedings of the 31st International Conference on Neural Information Processing Systems (NIPS'17) (Year: 2017).*
(Continued)

*Primary Examiner* — Brandon Hoffman
(74) *Attorney, Agent, or Firm* — Amin, Turocy & Watson, LLP

(57) ABSTRACT

Systems and techniques that facilitate name-invariant graph neural representations for automated theorem proving are provided. In various embodiments, a system can access a set of first directed acyclic graphs respectively representing a conjecture and a set of axioms. In various aspects, the system can generate, via execution of at least one neural-guided automated theorem prover that independently processes the set of first directed acyclic graphs, a proof for the conjecture. In various instances, the at least one neural-guided automated theorem prover can leverage, for a node representing a non-logical symbol name present in more than one of the set of first directed acyclic graphs, a name-invariant learned embedding based on a second directed acyclic graph that is an aggregation of the set of first directed acyclic graphs.

20 Claims, 12 Drawing Sheets

(56) References Cited

U.S. PATENT DOCUMENTS

| | | | | |
|---|---|---|---|---|
| 11,562,186 | B2 | 1/2023 | Goyal et al. | |
| 2015/0074031 | A1 | 3/2015 | Massie | |
| 2016/0179945 | A1* | 6/2016 | Lastra Diaz | G06F 16/284 707/739 |
| 2021/0150373 | A1 | 5/2021 | Crouse et al. | |
| 2021/0365817 | A1* | 11/2021 | Riegel | G06F 18/29 |

FOREIGN PATENT DOCUMENTS

| | | | |
|---|---|---|---|
| CN | 113627591 | A | 11/2021 |
| CN | 115204372 | A | 10/2022 |

OTHER PUBLICATIONS

Andrychowicz et al., "Hindsight Experience Replay", 31st Conference on Neural Information Processing Systems, 2017, 11 pages.
Aygun et al., "Proving Theorems using Incremental Learning and Hindsight Experience Replay", Proceedings of the 39th International Conference on Machine Learning, PMLR, vol. 162, 2022, 13 pages.
Bansal et al., "HOList: An Environment for Machine Learning of Higher-order Theorem Proving", Proceedings of the 36th International Conference on Machine Learning, PMLR, vol. 97, 2019, 10 pages.
Bronstein et al., "Geometric Deep Learning: Going Beyond Euclidean Data", IEEE Signal Processing Magazine, May 3, 2017, 22 pages.
Crouse et al., "Improving Graph Neural Network Representations of Logical Formulae with Subgraph Pooling", Nov. 15, 2020, 7 pages.
Crouse et al., "A Deep Reinforcement Learning Approach to First-order Logic Theorem Proving", The Thirty-Fifth AAAI Conference on Artificial Intelligence, 2021, pp. 6279-6287, 9 pages.
Grabowski et al., "Mizar in a Nutshell", Journal of Formalized Reasoning vol. 3, No. 2, 2010, 93 pages.
Hamadi et al., "ManySAT: A Parallel SAT Solver", Journal on Satisfiability, Boolean Modeling and Computation, vol. 6, No. 4, Jun. 2009, 18 pages.
Hawblitzel et al., "IronFleet: Proving Practical Distributed Systems Correct", Symposium on Operating Systems Principles, 2015, 17 pages.
Jakubuv et al., "Enigma Anonymous: Symbol-independent Inference Guiding Machine (System Description)", Springer, Apr. 28, 2020, 16 pages.
Loos et al., "Deep Network Guided Proof Search", EPIC Series in Computing, vol. 46, 2017, pp. 85-105, 21 pages.
Lucas, Peter, "The Representation of Medical Reasoning Models in Resolution-based Theorem Provers", Artificial Intelligence in Medicine, vol. 5, No. 5, 1993 pp. 395-414, 21 pages.
Masci et al., "Formal Verification of Medical Device User Interfaces Using PVS", Fundamental Approaches to Software Engineering, 2014, 15 pages.
Olsak et al., "Property Invariant Embedding for Automated Reasoning", Artificial Intelligence, 2019, 8 pages.
Paliwal et al., "Graph Representations for Higher-order Logic and Theorem Proving", The Thirty-Fourth AAAI Conference on Artificial Intelligence, 2020, pp. 2967-2974, 8 pages.
Rawson et al., "Directed Graph Networks for Logical Reasoning", In Workshop on Practical Aspects of Automated Reasoning, Jun. 2020, 10 pages.
Robinson, John Alan, "A Machine-oriented Logic Based on the Resolution Principle", Journal of the Association for Computing Machinery, vol. 12, No. 1, Jan. 1965, pp. 23-41, 19 pages.
Schulz, St., "We Know (Nearly) Nohing! But Can We Learn?", EPIC Series in Computing, vol. 51, 2017, 4 Pages.
Suda, Martin, "Vampire With a Brain Is a Good ITP Hammer", May 11, 2021, 19 pages.
Valenzano et al., "Simultaneously Searching with Multiple Settings: An Alternative to Parameter Tuning for Suboptimal Single-Agent Search Algorithms", Proceedings of the Twentieth International Conference on Automated Planning and Scheduling, 2010, pp. 177-184, 8 pages.
Wang et al., "Premise Selection for Theorem Proving by Deep Graph Embedding", Artificial Intelligence, Sep. 28, 2017, 11 pages.
Huberman et al., "An Economics Approach to Hard Computational Problems", Science, vol. 275, Jan. 1997, pp. 51-54, 4 pages.
Garland et al., "Using I/O Automata for Developing Distributed Systems", Foundations of component-based systems, 2000, 28 pages.
Katz et al., "Delfi: Online Planner Selection for Cost-Optimal Planning", IPC-9, 2018, 12 pages.
Rawson et al., "Directed Graph Networks for Logical Entailment", Technical report, 2020, 11 pages.
Abdelaziz, I. et al. | "Learning to Guide a Saturation-Based Theorem Prover." arXiv:2106.03906v1 [cs.AI] Jun. 7, 2021, 13 pages.
Aygun, E. et al. | "Proving Theorems using Incremental Learning and Hindsight Experience Replay." arXiv:2112.10664v1 [cs.AI] Dec. 20, 2021, 16 pages.
Kaliszyk, C. et al. | "Reinforcement Learning of Theorem Proving." arXiv:1805.07563v1 [cs.AI] May 19, 2018, 11 pages.
Kovacs, L. et al. | "First-Order Theorem Proving and Vampire*." In International Conference on Computer Aided Verification 2013, Incs 8044, pp. 1-35, Springer, 35 pages.
Schulz, St. | "E—A Brainiac Theorem Prover." Article in Ai Communications, Sep. 2002, 18 pages.
Zombori , Z. et al. | "Prolog Technology Reinforcement Learning Prover."arXiv:2004.06997v1 [cs.LO] Apr. 15, 2020, 19 pages.
Fokoue et al., "An Ensemble Approach for Automated Theorem Proving Based on Efficient Name Invariant Graph Neural Representations", https://arxiv.org/pdf/2305.08676, May 15, 2023, 9 page.

* cited by examiner

NAME-INVARIANT GRAPH NEURAL REPRESENTATIONS FOR AUTOMATED THEOREM PROVING

BACKGROUND

The subject disclosure relates to automated theorem proving, and more specifically to name-invariant graph neural representations for automated theorem proving.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, methods, or apparatuses that can facilitate name-invariant graph neural representations for automated theorem proving are described.

According to one or more embodiments, a system is provided. In various aspects, the system can comprise a processor that can execute computer-executable components stored in a non-transitory computer-readable memory. In various instances, the computer-executable components can comprise an access component that can access a set of first directed acyclic graphs respectively representing a conjecture and a set of axioms. In various cases, the computer-executable components can comprise a proof component that can generate, via execution of at least one neural-guided automated theorem prover that independently processes the set of first directed acyclic graphs, a proof for the conjecture. In various aspects, the at least one neural-guided automated theorem prover can leverage, for a node representing a non-logical symbol name present in more than one of the set of first directed acyclic graphs, a name-invariant learned embedding based on a second directed acyclic graph that is an aggregation of the set of first directed acyclic graphs.

In various aspects, the above-described system can be implemented as a computer-implemented method or as a computer program product.

DETAILED DESCRIPTION

Figure 1:
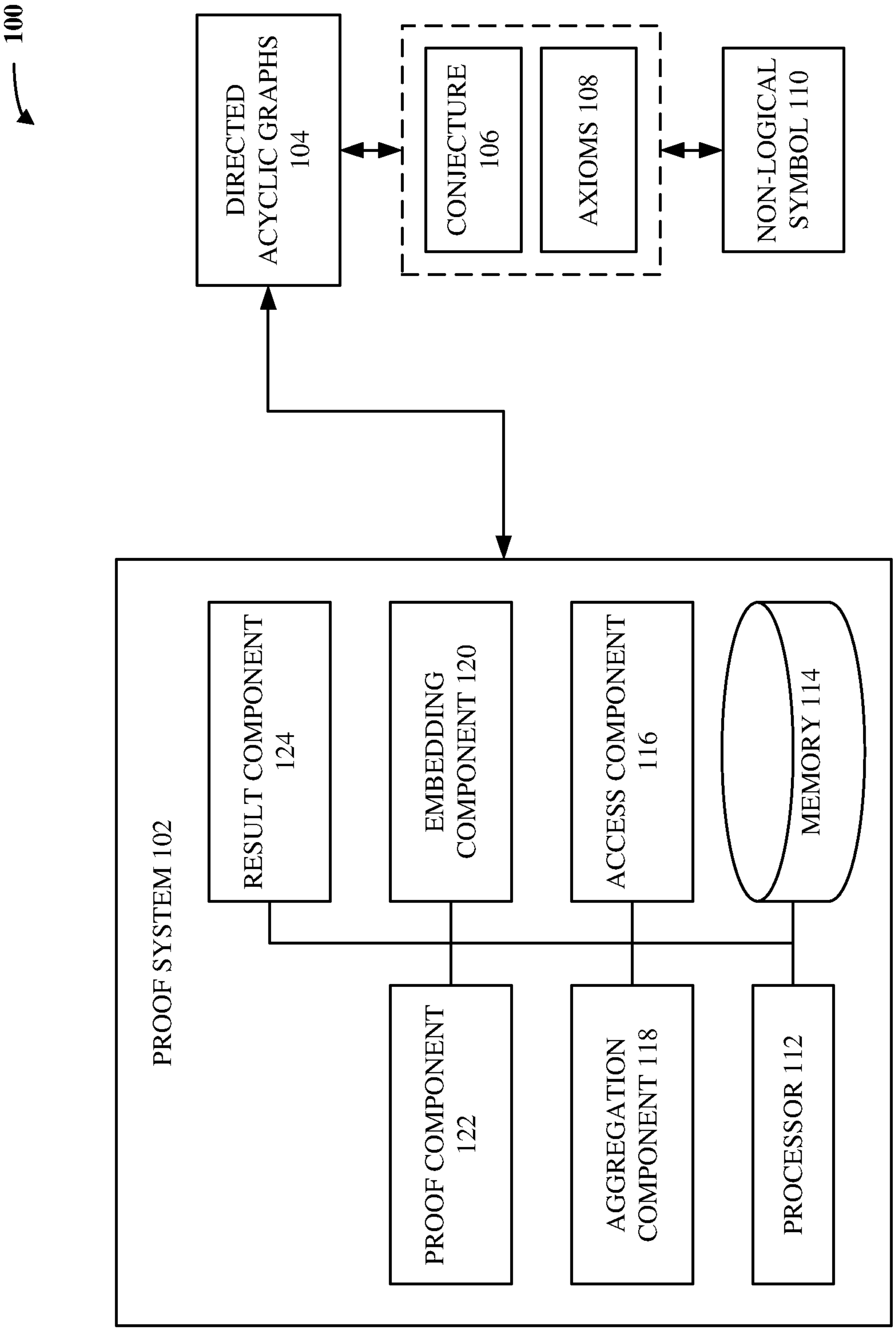
FIG. 1 illustrates a block diagram of an example, non-limiting system that facilitates name-invariant graph neural representations for automated theorem proving in accordance with one or more embodiments described herein.

The following detailed description is merely illustrative and is not intended to limit embodiments or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

In mathematics, when given a conjecture (e.g., a logical clause having an unknown truth value) and a set of axioms (e.g., one or more logical clauses that are known, deemed, or defined to be true), it can be desired to create a proof for the conjecture (e.g., to apply a sequence of sound inferencing rules to the set of axioms so as to prove or disprove the conjecture). Historically, proofs have been manually written by mathematicians. Recently, however, much research has been poured into the field of automated theorem proving.

Automated theorem proving can be considered as a technical field that focuses on enabling computers to perform specialized electronic computations so as to electronically generate proofs without human intervention. A computer that has been constructed or programmed according to the field of automated theorem proving can be referred to as an automated theorem prover (ATP). At its core, automated theorem proving can be considered as a complex search problem, where construction of a proof is treated as an electronic search through available inferencing rules until a satisfactory conclusion is reached.

For purposes of explanation, various aspects are described herein with respect to automated saturation-based theorem proving in first-order logic with equality. In such setting, an ATP can be given a set of clauses (e.g., a conjecture and various axioms), and the ATP can be equipped with a set of inferencing rules that can be applied to true logical clauses so as to yield new true logical clauses. To execute a proof search, the ATP can, at a high level, proceed by refutation. That is, the ATP can attempt to show that a negated conjecture together with a set of axioms entails a contradiction. In refutation-based theorem proving, the ATP can adjoin the negated conjecture to the set of axioms and can apply various of the set of inferencing rules repeatedly until either: a contradiction is found (e.g., meaning that the conjecture is true); a saturated set is obtained from which no new logical clauses can be derived (e.g., meaning that the conjecture is false); or a time budget elapses (e.g., in which case no conclusion can be drawn as to the conjecture). Also for purposes of explanation, logical clauses described herein are presented or expressed in the conjunctive normal form. Recall that a conjunctive normal form theory can be considered as being a conjunction of logical clauses, where each logical clause can be a disjunction of one or more literals. Moreover, each literal can be an atomic formula, where variables occurring within the atomic formula can be implicitly universally quantified (as opposed to existentially quantified). However, it is to be appreciated that various aspects described here can be applied or extended to any other suitable settings of automated theorem proving (e.g., to settings other than automated saturation-based theorem proving; to settings other than conjunctive normal form logic).

In any case, some existing techniques facilitate automated theorem proving via implementation of proof heuristics. Such existing techniques involve programming an ATP to search through available inferencing rules according to handcrafted guidelines (e.g., the handcrafted guidelines can govern the order in which the ATP explores or exploits different inferencing rule applications). Although such existing techniques can achieve effective performance, their reliance on proof heuristics renders them domain-specific. In other words, proof heuristics that are crafted for one particular domain (e.g., set theory) are not transferable to a different domain (e.g., relation algebra). Thus, ATPs that are constructed according to such existing techniques are not applicable across domains absent significant manual modification, which can be disadvantageous.

Other existing techniques facilitate automated theorem proving via geometric deep learning. Such other existing techniques utilize graph neural networks to capture the rich structure inherent to logic clauses and leverage such rich structure to guide proof search. Such other existing techniques can be considered as being domain-generic, such that an ATP that is guided by geometric deep learning can be used across domains without manual adjustment, unlike an ATP that is instead guided by proof heuristics. However, such other existing techniques nevertheless suffer various disadvantages.

In particular, when given a conjecture and a set of axioms, some existing geometric deep learning techniques involve converting the conjecture and the set of axioms into respective directed acyclic graphs (DAGs), assigning random initial embeddings (e.g., random vectors) to the nodes of those DAGs, executing a graph neural network (GNN) on each of those DAGs separately or independently of each other, thereby converting those random initial node embeddings into learned embeddings (e.g., latent vectors) that respectively represent those DAGs, and analyzing those learned embeddings via subsequent neural network layers so as to guide an underlying ATP (e.g., subsequent neural network layers can be considered as forming an attention-based reinforcement learning policy network that learns which inferencing rules to apply in response to specific DAGs). The reasoning process of the underlying ATP can involve applying any suitable inferencing rules to any of such DAGs, thereby yielding new DAGs that respectively represent new logical clauses that have been derived from the conjecture or from the axioms. Such new DAGs can be embedded by the GNN, and the underlying ATP can continue its reasoning process (e.g., can apply inferencing rules to those new logical clauses, thereby deriving even more new logical clauses) until termination. For purposes of explanation, such existing geometric deep learning techniques can be referred to as type-1 existing geometric deep learning techniques.

Type-1 existing geometric deep learning techniques are computationally efficient. After all, they can compute in parallel the embeddings of the DAGs representing the conjecture and the axioms, and such embeddings can be reused during reasoning by the underlying ATP. Indeed, new DAGs generated during the reasoning process can warrant additional executions of the GNN, but any DAG representing the conjecture or an axiom can remain unchanged throughout the reasoning process and can thus be reused for any suitable number of inferencing rule applications without being re-embedded. Unfortunately, however, type-1 existing geometric deep learning techniques can exhibit reduced performance (e.g., can require more inferencing steps to solve a given proof). This is because type-1 existing geometric deep learning techniques treat each logical clause (e.g., the conjecture; an axiom; or an inferred clause derived from the conjecture, from an axiom, or from another inferred clause) separately, despite the fact that the meaning of any one of those logical clauses can depend upon the other logical clauses that are available to the underlying ATP. In other words, there can be semantic interdependences between any of the conjecture, the set of axioms, and inferred or derived clauses, and such semantic interdependences are ignored or otherwise not faithfully considered by type-1 existing geometric deep learning techniques.

Other existing geometric deep learning techniques attempt to rectify this loss of interdependency information by selecting initial node embeddings based on node names. For example, whenever a node with a particular name is encountered, even across multiple DAGs, a particular initial embedding is assigned to that node. In other words, the initial embedding of node is sensitive to or otherwise dictated by the name of that node (e.g., changing the name of the node can commensurately change the initial embedding that is assigned to that node). Although name-sensitivity can recover some of the lost interdependency information between clauses (e.g., nodes that have the same name across different DAGs can be given the same initial embedding as each other), name-sensitivity can nevertheless be considered as problematic. Indeed, name-sensitive geometric deep learning techniques can experience difficulties when the data on which a neural proof guidance system and an underlying ATP are tested uses a different vocabulary than the data on which the neural proof guidance system and the underlying ATP are trained. For example, the testing data might have a symbol name that was not used or defined in the training data, or the testing data might have a same symbol as the training data but might use a different name for that symbol. Additionally, even if symbol naming is consistent between the testing data and the training data, name-sensitive techniques can nevertheless hinder model generalization by causing spurious learning or overfitting. For purposes of explanation, such name-sensitive geometric deep learning techniques can be referred to as type-2 existing geometric deep learning techniques.

Yet other existing geometric deep learning techniques involve converting the conjecture and the set of axioms into an overarching DAG, assigning random initial embeddings to the nodes of that overarching DAG, executing a GNN on that overarching DAG, thereby converting those random initial embeddings into a learned embedding representing that overarching DAG, and analyzing that learned embedding via subsequent neural network layers so as to guide an underlying ATP. The reasoning process of the underlying ATP can involve updating that overarching DAG via application of any suitable inferencing rules, thereby yielding an updated version of the overarching DAG that represents not just the conjecture and the axioms, but that also represents new logical clauses that have been derived from the conjecture or from the axioms. The updated version of the overarching DAG can be re-embedded by the GNN, and the underlying ATP can continue its reasoning process (e.g., can apply inferencing rules to the updated version of the overarching DAG, thereby deriving even more updated versions of the overarching DAG) until termination. For purposes of explanation, such other existing geometric deep learning techniques can be referred to as type-3 existing geometric deep learning techniques.

Type-3 existing geometric deep learning techniques can be considered as taking into account semantic interdependencies between the conjecture, the axioms, and any derived clauses. After all, such semantic interdependencies can be captured within the overarching DAG (or within any of its updated versions). However, type-3 existing geometric deep learning techniques consume excessively many computational resources (e.g., excessive computer memory space, excessive processing capacity, excessive reasoning time). After all, the number of axioms and of derived clauses can be quite large (e.g., tens, hundreds, or even thousands of axioms or derived clauses), and thus the overarching DAG (and its updated versions) can be commensurately large. Accordingly, re-embedding the overarching DAG after each update by the underlying ATP can be considered as highly computationally expensive. Contrast this with type-1 existing geometric deep learning techniques, in which the separate DAGs of the conjecture and of the axioms need not be re-embedded, and in which only the separate, derived DAGs representing new, derived clauses warrant embedding during the reasoning process (e.g., such separate, derived DAGs are much smaller than the overarching DAG, and thus embedding such separate, derived DAGs is not nearly as computationally expensive).

Accordingly, systems or techniques that can address one or more of these technical problems can be desirable.

Various embodiments described herein can address or ameliorate one or more of these technical problems. In various aspects, various embodiments described herein can include systems, computer-implemented methods, apparatus, or computer program products that can facilitate name-invariant graph neural representations for automated theorem proving. In particular, the inventors of various embodiments described herein devised various techniques for facilitating geometric deep learning guidance of ATPs, which techniques can take into account semantic interdependencies between logical clauses without consuming excessively many computational resources and without experiencing the pitfalls of name-sensitivity. In other words, various embodiments described herein can be considered as exhibiting the best of all worlds: more faithfulness to semantic interdependencies than type-1 existing geometric deep learning techniques; no vocabulary consistency challenges associated with name-sensitivity, unlike type-2 existing geometric deep learning techniques; and less computational expense than type-3 existing geometric deep learning techniques.

Various embodiments described herein can achieve these benefits as follows. Consider separate DAGs that respectively represent a conjecture and axioms. For ease of explanation, the conjecture and axioms can be collectively referred to as given logical clauses. It can be the case that there are one or more non-logical symbol names (e.g., names of constants, names of predicates, names of functions) that are each present in multiple respective ones of those given logical clauses. So, those one or more non-logical symbol names can be represented by respective nodes in multiple respective ones of the separate DAGs. In various aspects, the separate DAGs can be aggregated together, thereby yielding a unified DAG that represents a total structural context of the conjecture and of the axioms. Note that, for each node that represents a non-logical symbol name, repeated instances of that node can be collapsed together in the unified DAG. In various cases, the nodes of the unified DAG can initially be assigned random embeddings, and a GNN can then be executed on the unified DAG, so as to convert those random embeddings to learned embeddings. Note that such learned embeddings generated from the unified DAG can be considered as name-invariant learned embeddings that respectively represent how those nodes relate to or otherwise fit within the total structural context of the conjecture and of the axioms (e.g., those learned embeddings are not dictated by the names of those nodes; instead, those learned embeddings are generated based on those nodes' roles in the total structural context represented by the unified DAG). In various aspects, the separate DAGs can then be embedded (e.g., by the same or another GNN) and subsequently processed (e.g., by an attention-based reinforcement learning policy network and by an underlying ATP) independently of each other. However, whenever any separate DAG is encountered during such independent processing that has a node representing a non-logical symbol name, the initial embedding assigned to that node can be not a random embedding and can also be not an embedding whose content is dictated by that non-logical symbol name. Instead, the initial embedding assigned to that node can be whatever learned embedding was generated for that node based on the unified DAG. In this way, the separate DAGs can be processed independently of each other, which can reduce computational expense, but such separate DAGs can nevertheless be considered as being faithful to semantic interdependencies amongst each other. After all, for any given node that represents a non-logical symbol name, the learned embedding for that node that is generated from the unified DAG can be considered as capturing or representing that node's global semantic role within the total structural context of the conjecture and of the axioms. So, if that node is present in multiple separate DAGs, initially assigning that learned embedding (rather than a random embedding and rather than a name-sensitive embedding) to that node in each of such multiple separate DAGs can be considered as informing each of such multiple separate DAGs of that node's global semantic role. As described herein, such embodiments can allow an underlying ATP to solve more proofs, in less time, using fewer inferencing steps, as compared to type-1, type-2, or type-3 existing geometric deep learning techniques.

Additionally, the present inventors realized that performance can be further improved by implementing an ensembling scheme for automated theorem proving. In particular, such ensembling scheme can involve having multiple instances of a neural guidance system and of an underlying ATP, and such ensembling scheme can involve not only assigning different random parameter (e.g., weight matrix, bias vector) initializations to the different instances of the neural guidance system before training, but can also involve setting each instance of the underlying ATP to a unique or distinct configuration (e.g., distinct literal selection strategies, distinct schedule modes, distinct term orderings).

Various embodiments described herein can be considered as a computerized tool (e.g., any suitable combination of computer-executable hardware or computer-executable software) that can facilitate name-invariant graph neural representations for automated theorem proving. In various aspects, such a computerized tool can comprise an access component, an aggregation component, an embedding component, a proof component, or a result component.

In various embodiments, there can be a set of DAGs. In various aspects, the set of DAGs can comprise any suitable number of DAGs. In various instances, any of the set of DAGs can comprise any suitable number of nodes and any suitable number of edges. In various cases, one of the set of DAGs can represent a conjecture, and a remainder of the set of DAGs can respectively represent a set of axioms that pertain to the conjecture. In various aspects, if a DAG represents a logical clause (e.g., the conjecture or an axiom), the nodes of that DAG can be considered as corresponding to logical symbols or non-logical symbols (or names thereof) that are present in the logical clause, and the edges of that DAG can be considered as representing the nested order, arrangement, or organization of those symbols. Recall that a logical symbol can be considered as a symbol in first-order logic that has a same or uniform meaning, regardless of interpretation. Examples of a logical symbol can include conjunctive operators (e.g., AND), disjunctive operators (e.g., OR), negation operations (e.g., NOT), equivalence operators (e.g., ≡), or implication operators (e.g., →). In contrast, recall that a non-logical symbol can be considered as a symbol in first-order logic whose meaning can vary with interpretation. Examples of a non-logical symbol can include variables, constants, predicates, or functions.

In various aspects, an equivalence-preserving variable renaming can be implemented, so that each variable within the conjecture or the set of axioms is anonymized and thus treated as having a unique or distinct name. That is, it can be the case that none of the conjecture or the set of axioms can refer to the same variable as each other.

In various instances, there can be a particular non-logical symbol that has a particular name and that is present in more than one of the conjecture or of the set of axioms. Due to the above-mentioned equivalence-preserving variable renaming, that particular non-logical symbol can be not a variable. Instead, that particular non-logical symbol can be a particular constant, a particular predicate, or a particular function that appears in more than one of the conjecture or the set of axioms. That is, two or more of the conjecture or the set of axioms can refer to the same particular constant, to the same particular predicate, or to the same particular function as each other.

Now, consider a logical clause (e.g., the conjecture, or one of the set of axioms) that contains the particular non-logical symbol. For ease of explanation, suppose that such logical clause includes w instances or usages of the particular non-logical symbol, for any suitable positive integer w. In various aspects, the DAG that represents such logical clause can convey the particular non-logical symbol via a total of w+1 nodes: one node representing the name of that particular non-logical symbol, and w anonymized nodes that are each coupled to that one named node and that respectively represent the w locations at which the particular non-logical symbol occurs in the logical clause.

In various aspects, it can be desired to prove the conjecture true or false based on the set of axioms. As described herein, the computerized tool can facilitate such proof, by analyzing the set of DAGs with name-invariant learned embeddings.

In various embodiments, the access component of the computerized tool can electronically receive, import, or otherwise access, via any suitable wired or wireless electronic connections, the set of DAGs. For example, the access component can retrieve the set of DAGs from any suitable centralized or decentralized data structure (e.g., graph data structure, relational data structure, hybrid data structure), whether remote from or local to the access component. In any case, the access component can access or obtain the set of DAGs, such that other components of the computerized tool can electronically interact with (e.g., read, write, edit, copy, manipulate) the set of DAGs.

In various embodiments, the aggregation component of the computerized tool can electronically aggregate the set of DAGs, thereby forming a unified DAG. More specifically, the aggregation component can combine the set of DAGs together via a conjunction. That is, the aggregation component can: insert each of the set of DAGs into a common graph structure; insert into that common graph structure a node that represents a logical conjunction operator; and insert directed edges into that common graph structure, so that the node representing the logical conjunction operator is coupled (e.g., via outbound directed edges) to the root node of each of the set of DAGs. Note that, at such point, the common graph structure can be considered as containing two or more instances of the node that represents the name of the particular non-logical symbol. After all, as mentioned above, the name of the particular non-logical symbol can be represented by one node in each DAG in which the non-logical symbol is present, and the non-logical symbol can be present in two or more of the set of DAGs. Accordingly, in various cases, the aggregation component can collapse together such repeated instances of the node that represents the name of the particular non-logical symbol. At such point, the common graph structure can be considered as being made up of the set of DAGs, where all of the set of DAGs are coupled at a root-end by the logical conjunction operator, and where more than one of the set of DAGs are coupled at a leaf-end by the node representing the name of the particular non-logical symbol. Such common graph structure can be considered as the unified DAG.

In various embodiments, the embedding component of the computerized tool can electronically store, maintain, control, or otherwise access a graph neural network (GNN). In various aspects, the GNN can exhibit any suitable geometric deep learning internal architecture. For example, the GNN can include any suitable numbers of any suitable types of layers (e.g., input layer, one or more hidden layers, output layer, any of which can be message passing layers, graph convolutional layers, attention layers, non-linearity layers, or pooling layers). As another example, the GNN can include any suitable activation functions (e.g., softmax, sigmoid, hyperbolic tangent, rectified linear unit).

Regardless of its internal architecture, the GNN can be trained in any suitable fashion (e.g., via supervised training, via unsupervised training, via reinforcement learning) to generate learned node-wise embeddings for an inputted graph. In various aspects, the embedding component can accordingly electronically execute the GNN on the unified DAG, which can yield learned node-wise embeddings respectively corresponding to the nodes of the unified DAG. More specifically, the embedding component can generate random node-wise embeddings that respectively correspond to the nodes of the unified DAG, the embedding component can feed the unified DAG and such random node-wise embeddings to an input layer of the GNN, the unified DAG and such random node-wise embeddings can complete a forward pass through one or more hidden layers of the GNN, and an output layer of the GNN can compute the learned node-wise embeddings based on activations from the one or more hidden layers of the GNN. In other words, the random node-wise embeddings can be considered as initial embeddings for the nodes of the unified DAG, and the GNN can be considered as converting or transforming those initial embeddings into the learned node-wise embeddings.

Note that the node that represents the name of the particular non-logical symbol can correspond to one of such learned node-wise embeddings. That learned node-wise embedding can be considered as a real-valued, fixed-length vector that represents that node within an encoding space or latent space of the GNN. In other words, such learned node-wise embedding can be considered as numerically quantifying how the node that represents the name of the particular non-logical symbol relates to or otherwise fits within the totality of the unified DAG, and thus as commensurately representing how the particular non-logical symbol fits within the totality of the conjecture and the set of axioms. Although the node itself can be considered as representing the name of the particular non-logical symbol, note that the content of the learned embedding for that node is not dictated, determined, or otherwise influenced in any way by the name. That is, the GNN can have generated the learned embedding for that node based upon that node's random initial embedding and upon that node's role or location within the unified DAG; the GNN can be considered as having ignored or not known that such node represented the name of the particular non-logical symbol. Therefore, the learned embedding that corresponds to the node representing the name of the particular non-logical symbol can be referred to as a name-invariant learned embedding (e.g., the learned embedding represents that node's intra-graph role in relation to other nodes, no matter what specific name that node itself represents).

In various embodiments, the proof component of the computerized tool can electronically store, maintain, control, or otherwise access a neural-guided ATP. In various aspects, the neural-guided ATP can exhibit any suitable construction or architecture. For example, the neural-guided ATP can exhibit a TRAIL architecture (e.g., Trial Reasoner for AI that Learns) or can exhibit a HER architecture (e.g., Hindsight Experience Replay). In any case, the proof component can electronically generate a proof for the conjecture, by executing the neural-guided ATP on the set of DAGs. In various aspects, the neural-guided ATP can independently or separately process each of the set of DAGs, and such independent or separate processing can involve generating a respective learned graph-wise embedding for each of the set of DAGs based on randomly initialized node-wise embeddings. However, whenever the neural-guided ATP encounters the node that represents the name of the particular non-logical symbol, the neural-guided ATP can refrain from assigning to that node a random initial embedding. Instead, the neural-guided ATP can initially assign to that node the name-invariant learned embedding that was generated based on the unified DAG. By using the name-invariant learned embedding for initialization, each DAG that contains the node that represents the name of the particular non-logical symbol can be considered as knowing that node's role in the totality of the unified DAG, and thus as knowing that node's role in each of the other individual or separate DAGs in which it appears. Accordingly, the neural-guided ATP can process each DAG independently or separately, without losing rich interdependency information between the set of DAGs. For this reason, the neural-guided ATP can achieve better performance (e.g., can solve more proofs, in less time, using fewer inferencing rule applications) that if the neural-guided ATP instead utilized only random embedding initializations.

Moreover, rather than implementing a single instance of the neural-guided ATP, the computerized tool can, in various aspects, implement an ensemble of instances of the neural-guided ATP. In such cases, each of such ensemble of instances can be equipped, outfitted, or otherwise set to a respective, unique, or distinct proof search configuration (e.g., distinct literal selection strategies, distinct schedule modes, distinct term orderings). Implementation of such an ensemble can further improve performance (e.g., can further reduce the amount of time or the number of inferencing rule applications needed to solve a proof).

In various embodiments, the result component of the computerized tool can initiate any suitable electronic actions based on the proof generated by the proof component. For example, the result component can electronically render the proof on any suitable electronic display. As another example, the result component can electronically transmit the proof to any other suitable computing device.

Various embodiments described herein can be employed to use hardware or software to solve problems that are highly technical in nature (e.g., to facilitate name-invariant graph neural representations for automated theorem proving), that are not abstract and that cannot be performed as a set of mental acts by a human. Further, some of the processes performed can be performed by a specialized computer (e.g., graph neural networks having internal parameters such as graph convolutional kernels or attention vectors) for carrying out defined acts related to automated theorem proving.

For example, such defined acts can include: accessing, by a device operatively coupled to a processor, a set of first directed acyclic graphs respectively representing a conjecture and a set of axioms; and generating, by the device and via execution of at least one neural-guided automated theorem prover that independently processes the set of first directed acyclic graphs, a proof for the conjecture, wherein the at least one neural-guided automated theorem prover leverages, for a node representing a non-logical symbol name present in more than one of the set of first directed acyclic graphs, a name-invariant learned embedding based on a second directed acyclic graph that is an aggregation of the set of first directed acyclic graphs.

Such defined acts are not performed manually by humans. Indeed, neither the human mind nor a human with pen and paper can electronically access DAGs and electronically execute an ATP on the DAGs, where the ATP processes the DAGs independently of each other but nevertheless utilizes a learned node-wise embedding that was derived by a GNN from an aggregation of the DAGs. Indeed, an ATP is an inherently-computerized construct that simply cannot be meaningfully executed in any way by the human mind without computers. After all, as mentioned above, the very field of automated theorem proving is focused on programming computers to automatically generate proofs without human intervention. Furthermore, a learned embedding of a graph node is a latent vector representation of that graph node that is generated by a GNN. A GNN and the learned embeddings that it can generate are inherently-computerized constructs that cannot be meaningfully implemented in any way by the human mind without computers. Accordingly, a computerized tool that can generate a proof for a conjecture, by executing an ATP on DAGs representing that conjecture, where the ATP leverages learned node-wise embeddings for initialization instead of random node-wise embeddings, is likewise inherently-computerized and cannot be implemented in any sensible, practical, or reasonable way without computers.

Moreover, various embodiments described herein can integrate into a practical application various teachings relating to automated theorem proving. As explained above, some existing techniques facilitate automated theorem proving via proof heuristics. Although such existing techniques can achieve good performance, they are domain-specific and require significant manual alteration to be used across domains. In contrast, geometric deep learning techniques can facilitate automated theorem proving across domains. However, geometric deep learning techniques nevertheless suffer from their own disadvantages. Indeed, as explained above, type-1 existing geometric deep learning techniques process DAGs independently of each other and are thus computationally efficient, but they fail to account for interdependencies between separate DAGs, which can reduce performance (e.g., can cause them to solve fewer problems in a given time limit, can cause them to use more inferencing rule applications to solve a given proof). As also explained above, type-2 existing geometric deep learning techniques recover some of such lost interdependencies by utilizing name-sensitive node embedding initializations. However, they are vulnerable to vocabulary inconsistencies and often exhibit overfitting or spurious learning. Also explained above, type-3 existing geometric deep learning techniques continually update a single, overarching DAG, and thus they do not lose the rich interdependency information that type-1 existing geometric deep learning techniques lose. However, type-3 existing geometric deep learning techniques are excessively computationally expensive.

Various embodiments described herein can address one or more of these technical problems. Specifically, there can be a set of DAGs that respectively represent a conjecture and a set of axioms. In various aspects, one or more non-logical symbols can be present in more than one of the conjecture or the set of axioms. Accordingly, node respectively representing the names of those particular non-logical symbols can be present in more than one of the set of DAGs. In various instances, the set of DAGs can be aggregated together via a conjunction, so as to form a unified DAG in which repeated instances of the nodes respectively representing the names of the particular non-logical symbols have been respectively collapsed together. In various cases, a trained GNN can be executed on the unified DAG, thereby yielding a respective learned embedding for each of the nodes respectively representing the names of the particular non-logical symbols. In various aspects, a neural-guided ATP can then process the set of DAGs independently of each other, which can involve separately embedding each of the set of DAGs. But, whenever the neural-guided ATP comes across any of the nodes respectively representing the names of the particular non-logical symbols, the neural-guided ATP can refrain from initially assigning to that node a random embedding. Instead, the neural-guided ATP can initially assign to that node whatever learned embedding that was generated for that node from the unified DAG. In this way, the neural-guided ATP can separately process each of the set of DAGs without losing rich interdependency information. After all, the learned embeddings of the nodes respectively representing the names of the particular non-logical symbols can respectively represent those nodes' global structural roles in the unified DAG (e.g., can respectively represent the particular non-logical symbols' global structural roles in the conjecture and in the set of axioms). So, by using those learned node embeddings for initialization of each independent DAG that contains those nodes, each such DAG can be considered as knowing those nodes' global roles, notwithstanding that each such DAG is separate from the remainder of the set of DAGs. In this way, faster proof search can be achieved without sacrificing interdependency information.

Additionally, various embodiments described herein can involve utilizing an ensemble of neural-guided ATPs, each of which can be set to a unique or distinct proof search configuration. Such ensembling can further help to increase the speed with which proofs are generated or can further help to reduce the number of inferencing rule applications needed to generate a given proof.

For at least these reasons, various embodiments described herein certainly constitute a concrete and tangible technical improvement in the field of automated theorem proving. Therefore, various embodiments described herein clearly qualify as useful and practical applications of computers.

Furthermore, various embodiments described herein can control real-world tangible devices based on the disclosed teachings. For example, various embodiments described herein can electronically train or execute real-world GNNs and real-world ATPs, and such embodiments can electronically render resulting proofs on real-world computer screens.

It should be appreciated that the herein figures and description provide non-limiting examples of various embodiments and are not necessarily drawn to scale.

FIG. 1 illustrates a block diagram of an example, non-limiting system 100 that can facilitate name-invariant graph neural representations for automated theorem proving in accordance with one or more embodiments described herein. As shown, a proof system 102 can be electronically integrated, via any suitable wired or wireless electronic connections, with a set of directed acyclic graphs 104 (hereafter "set of DAGs 104").

In various embodiments, the set of DAGs 104 can comprise a total of z DAGs for any suitable positive integer z. In various aspects, any DAG of the set of DAGs 104 can comprise any suitable number of nodes and can comprise any suitable number of directed edges. In various instances, different ones of the set of DAGs 104 can have different numbers or arrangements of nodes or directed edges as each other.

In various cases, the set of DAGs 104 can respectively correspond (e.g., in one-to-one fashion) to a conjecture 106 and to a set of axioms 108. In various aspects, the conjecture 106 can be any suitable logical clause (e.g., a disjunction of literals) that is desired to be proven true or false. In various instances, the set of axioms 108 can comprise a total of $z-1$ axioms, and each of such $z-1$ axioms can be any suitable logical clause that is known or otherwise deemed to be true. In various cases, a logical clause (e.g., the conjecture 106, or any of the set of axioms 108) can comprise any suitable number of logical symbols or any suitable number of non-logical symbols that can be arranged, ordered, or nested with respect to each other.

As mentioned above, a logical symbol can be any suitable notational symbol used in first-order logic that possesses a uniform meaning regardless of whichever logical interpretation is currently being applied. As a non-limiting example, a conjunction operator can be considered as a logical symbol, because the conjunction operator has a uniform meaning (e.g., AND) no matter what interpretation is applied. As another non-limiting example, a disjunction operator can be considered as a logical symbol, because the disjunction operator has a uniform meaning (e.g., OR) no matter what interpretation is applied. As yet another non-limiting example, a negation operator can be considered as a logical symbol, because the negation operator has a uniform meaning (e.g., NOT) no matter what interpretation is applied. As still another non-limiting example, an equivalence operator can be considered as a logical symbol, because the equivalence operator has a uniform meaning (e.g., EQUIVALENT TO) no matter what interpretation is applied. As even another non-limiting example, an implication operator can be considered as a logical symbol, because the implication operator has a uniform meaning (e.g., IMPLIES, YIELDS) no matter what interpretation is applied.

In contrast, a non-logical symbol can be any suitable notational symbol used in first-order logic that possesses a meaning that depends upon whatever interpretation is currently being applied. As a non-limiting example, a constant can be a non-logical symbol, because the constant can represent different units in different contexts (e.g., in one context, a constant j can represent a number of meters; in a different context, the constant j can instead represent a number of hours). As another non-limiting example, a variable can be a non-logical symbol, because the variable can take on different values in different contexts (e.g., in one context, a variable k can denote a positive integer; in a different context, the variable k can instead denote a negative real number). As yet another non-limiting example, a function can be a non-logical symbol, because the inner workings or specific operations performed by the function can be different in different contexts (e.g., in one context, a function $f$ can denote trigonometric operations; in a different context, the function $f$ can instead denote exponential or logarithmic operations). As even another non-limiting example, a predicate can be a non-logical symbol, because an attribute, characteristic, or relation called by the predicate can be different in different contexts (e.g., in one context, a predicate p can call a size characteristic; in a different context, the predicate p can instead call a shape characteristic).

In any case, one of the set of DAGs 104 can represent the conjecture 106, and the remaining z−1 of the set of DAGs 104 can respectively represent the set of axioms 108. For a DAG that represents any given logical clause (e.g., that represents the conjecture 106, or that represents any of the set of axioms 108), the nodes of that DAG can be considered as respectively corresponding to the logical symbols or to the non-logical symbols of that given logical clause, and the directed edges of that DAG that can be considered as representing how those logical symbols or non-logical symbols are nested, ordered, or otherwise arranged with respect to each other.

In various aspects, whichever of the set of DAGs 104 represents the conjecture 106 can be considered as the result of collapsing identical subtrees of an abstract syntax tree of the conjecture 106 into single nodes with multiple parents. Likewise, whichever of the set of DAGs 104 represents any given one of the set of axioms 108 can be considered as the result of collapsing identical subtrees of an abstract syntax tree of that given axiom into single nodes with multiple parents.

In various aspects, an equivalence-preserving variable renaming (e.g., which can include skolem renaming to remove existentially quantified variables) can be implemented, so that each variable that is included in the conjecture 106 or in the set of axioms 108 can be anonymized and thus treated as having a unique or distinct name. In other words, it can be the case that no variable occurs more than once in the conjecture 106 and in the set of axioms 108, and it can be the case that no variable is shared among two or more of the conjecture 106 and the set of axioms 108.

In various aspects, there can be a non-logical symbol 110. In various instances, the non-logical symbol 110 can be present in any two or more of the conjecture 106 or of the set of axioms 108. Because of the above-mentioned equivalence-preserving variable renaming, the non-logical symbol 110 can be not a variable. Instead, the non-logical symbol 110 can, in various cases, be a constant. In such cases, two or more of the conjecture 106 or of the set of axioms 108 can be considered as including or reciting the same constant as each other. In other cases, the non-logical symbol 110 can be a predicate. In such cases, two or more of the conjecture 106 or of the set of axioms 108 can be considered as including or reciting the same predicate as each other. In yet other cases, the non-logical symbol 110 can be a function. In such cases, two or more of the conjecture 106 or of the set of axioms 108 can be considered as including or reciting the same function as each other.

Although the herein figures depict one non-logical symbol 110, this is a mere non-limiting example for ease of illustration and explanation. It should be appreciated that various embodiments described here can be applied to any suitable number of non-logical symbols, each of which can be present in two or more respective ones of the set of DAGs 104 (e.g., such multiple non-logical symbols need not be in the same individual DAGs as each other).

Consider a logical clause (e.g., the conjecture 106, or any of the set of axioms 108) that contains the non-logical symbol 110. Suppose that the non-logical symbol 110 is recited w times in that logical clause, for any suitable positive integer w. In various aspects, the DAG (e.g., one of the set of DAGs 104) that represents that logical clause can include or contain a total of w+1 nodes in order to represent the non-logical symbol 110. In particular, one of such w+1 nodes can be considered as representing the name of the non-logical symbol 110, and the remaining w of such w+1 nodes can be considered as respectively representing the w intra-clause locations at which the non-logical symbol 110 is positioned. Non-limiting aspects are described with respect to FIG. 2.

Figure 2:
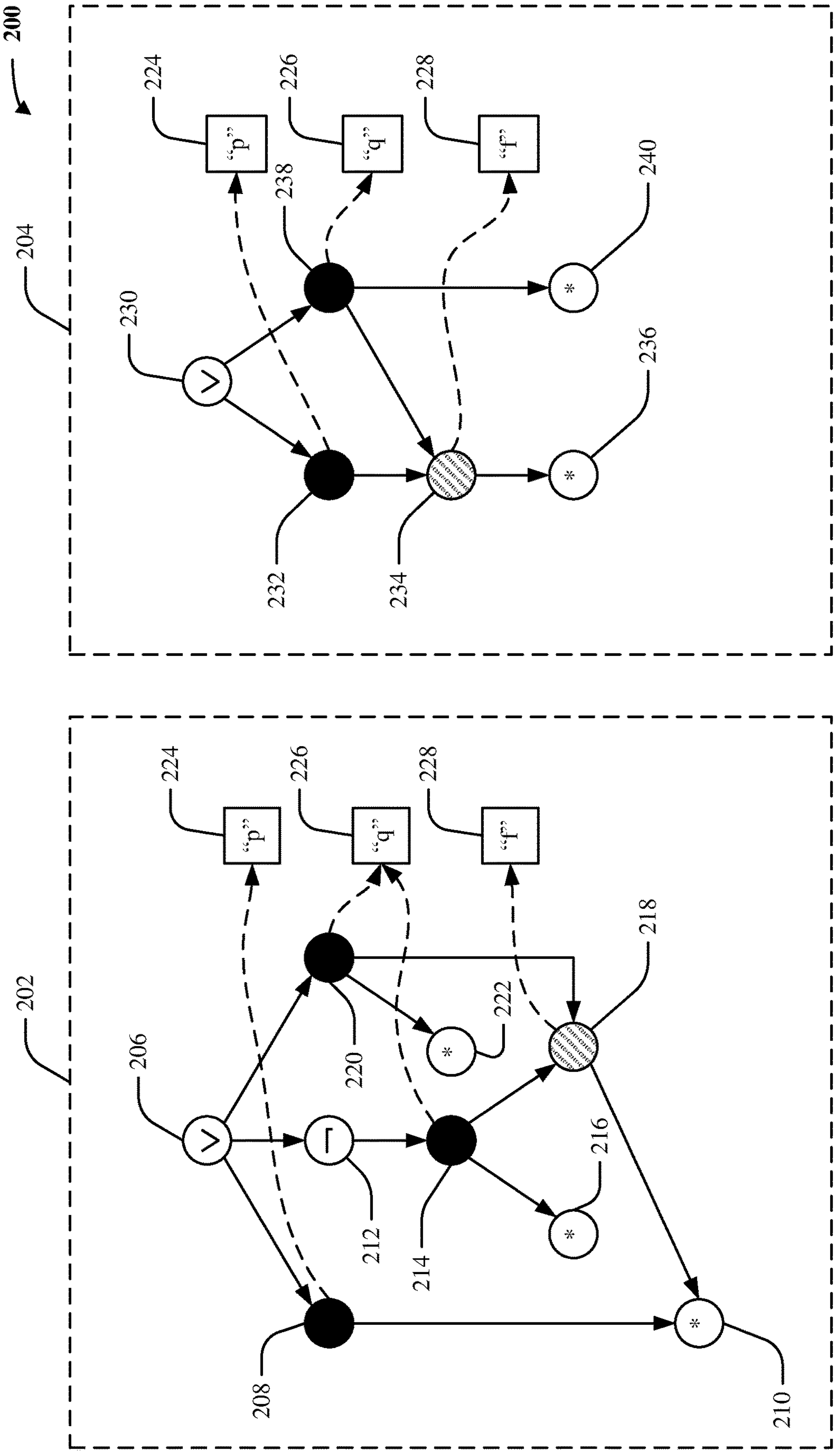
FIG. 2 illustrates an example, non-limiting block diagram of disconnected directed acyclic graphs in accordance with one or more embodiments described herein.

FIG. 2 illustrates an example, non-limiting block diagram 200 of disconnected directed acyclic graphs in accordance with one or more embodiments described herein.

As shown, there can be a DAG 202 and a DAG 204, which can be disconnected, separated, or otherwise independent of each other. In the non-limiting example of FIG. 2, the DAG 202 and the DAG 204 can be considered as collectively forming the set of DAGs 104. In such cases, the set of axioms 108 can be considered as comprising one axiom; one of the DAG 202 and the DAG 204 can represent that one axiom; and the other of the DAG 202 and the DAG 204 can represent the conjecture 106 (or a negation thereof).

In various aspects, the DAG 202 can comprise, as a root, a disjunction node 206, and the DAG 202 can comprise three paths that branch off from the disjunction node 206. A first of such three paths can include an anonymized predicate node 208 and an anonymized variable node 210. A second of such three paths can include a negation node 212, an anonymized predicate node 214, an anonymized variable node 216, an anonymized function node 218, and the anonymized variable node 210. A third of such three paths can include an anonymized predicate node 220, an anonymized variable node 222, the anonymized function node 218, and the anonymized variable node 210. In various cases, as shown, the DAG 202 can further comprise a naming node 224, a naming node 226, and a naming node 228.

In various aspects, the anonymized predicate node 208 can be coupled to the naming node 224. Thus, the anonymized predicate node 208 can be considered as an instance of whatever predicate whose name is indicated by the naming node 224. In the non-limiting example of FIG. 2, the naming node 224 can indicate the name "p", and so the anonymized predicate node 208 can be considered as an instance of the predicate p, whatever the predicate p may be.

Similarly, in various cases, the anonymized predicate nodes 214 and 220 can be coupled to the naming node 226. Thus, the anonymized predicate nodes 214 and 220 can be considered as two instances of whatever predicate whose name is indicated by the naming node 226. In the non-limiting example of FIG. 2, the naming node 226 can indicate the name "q", and so the anonymized predicate node 214 can be considered as a first instance of the predicate q, and the anonymized predicate node 220 can be considered as a second instance of the predicate q, whatever the predicate q may be.

Likewise, in various aspects, the anonymized function node 218 can be coupled to the naming node 228. Thus, the anonymized function node 218 can be considered as an instance of whatever function whose name is indicated by the naming node 228. In the non-limiting example of FIG. 2, the naming node 228 can indicate the name "ƒ", and so the anonymized function node 218 can be considered as an instance of the function ƒ, whatever the function ƒ may be.

With the non-limiting structure shown in FIG. 2, the DAG 202 can be considered as representing the following clause: $\forall A, B, C: p(A) \vee \neg q(B, f(A)) \vee q(C, f(A))$, where A can be the unique name of the anonymized variable node 210, where B can be the unique name of the anonymized variable node 216, and where C can be the unique name of the anonymized variable node 222. Note that such clause can be considered as a disjunction of three literals: a first literal (e.g., $p(A)$) represented by the anonymized predicate node 208 and the anonymized variable node 210; a second literal (e.g., $\neg q(B, f(A))$) denoted by the negation node 212, the anonymized predicate node 214, the anonymized variable node 216, the anonymized function node 218, and the anonymized variable node 210; and a third literal (e.g., $q(C, f(A))$) denoted by the anonymized predicate node 220, the anonymized variable node 222, the anonymized function node 218, and the anonymized variable node 210.

In various aspects, the DAG 204 can comprise, as a root, a disjunction node 230, and the DAG 204 can comprise two paths that branch off from the disjunction node 230. A first of such two paths can include an anonymized predicate node 232, an anonymized function node 234, and an anonymized variable node 236. A second of such two paths can include an anonymized predicate node 238, the anonymized function node 234, the anonymized variable node 236, and an anonymized variable node 240. In various cases, as shown, the DAG 204 can also comprise the naming node 224, the naming node 226, and the naming node 228.

In various aspects, the anonymized predicate node 232 can be coupled to the naming node 224. Thus, the anonymized predicate node 232 can be considered as an instance of the predicate p, just like the anonymized predicate node 208.

Similarly, in various cases, the anonymized predicate node 238 can be coupled to the naming node 226. Thus, the anonymized predicate node 238 can be considered as an instance of the predicate q, just like the anonymized predicate nodes 214 and 220.

Likewise, in various aspects, the anonymized function node 234 can be coupled to the naming node 228. Thus, the anonymized function node 234 can be considered as an instance of the function ƒ, just like the anonymized function node 218.

With the non-limiting structure shown in FIG. 2, the DAG 204 can be considered as representing the following clause: $\forall X, Y: p(f(X)) \vee q(f(X), Y)$, where X can be the unique name of the anonymized variable node 236, and where Y can be the unique name of the anonymized variable node 240. Note that such clause can be considered as a disjunction of two literals: a first literal (e.g., $p(f(X))$) represented by the anonymized predicate node 232, the anonymized function node 234, and the anonymized variable node 236; and a second literal (e.g., $q(f(X), Y)$) denoted by the anonymized predicate node 238, the anonymized function node 234, the anonymized variable node 236, and the anonymized variable node 240.

Note that, although the DAG 202 and the DAG 204 can be separate, independent, or otherwise disconnected from each other, they can nevertheless share some non-logical symbols.

As a non-limiting example, the DAG 202 and the DAG 204 can share the predicate p. Accordingly, in various aspects, the predicate p can be considered as the non-logical symbol 110. In the clause represented by the DAG 202, the predicate p can be recited one time (e.g., w=1). Accordingly, the DAG 202 can include two nodes (e.g., w+1) corresponding to the predicate p: one node (e.g., 224) representing the name of the predicate p, and another node (e.g., 208) that shows where in that clause the predicate p is applied. In the clause represented by the DAG 204, the predicate p can also be recited one time (e.g., w=1). Accordingly, the DAG 204 can include two nodes (e.g., w+1) corresponding to the predicate p: one node (e.g., 224) representing the name of the predicate p, and another node (e.g., 232) that shows where in that clause the predicate p is applied.

As another non-limiting example, the DAG 202 and the DAG 204 can share the predicate q. Accordingly, in various aspects, the predicate q can be considered as the non-logical symbol 110. In the clause represented by the DAG 202, the predicate q can be recited two times (e.g., w=2). Accordingly, the DAG 202 can include three nodes (e.g., w+1) corresponding to the predicate q: one node (e.g., 226) representing the name of the predicate p, and two nodes (e.g., 214 and 220) that show where in that clause the predicate q is applied. In the clause represented by the DAG 204, the predicate q can be recited one time (e.g., w=1). Accordingly, the DAG 204 can include two nodes (e.g., w+1) corresponding to the predicate q: one node (e.g., 226) representing the name of the predicate q, and another node (e.g., 238) that shows where in that clause the predicate q is applied.

As yet another non-limiting example, the DAG 202 and the DAG 204 can share the function *f*. Accordingly, in various aspects, the function *f* can be considered as the non-logical symbol 110. In the clause represented by the DAG 202, the function *f* can be recited one time (e.g., w=1). Accordingly, the DAG 202 can include two nodes (e.g., w+1) corresponding to the function *f*: one node (e.g., 228) representing the name of the function *f*, and another node (e.g., 218) that shows where in that clause the function *f* is applied. In the clause represented by the DAG 204, the function *f* can also be recited one time (e.g., w=1). Accordingly, the DAG 204 can include two nodes (e.g., w+1) corresponding to the function *f*: one node (e.g., 228) representing the name of the function *f*, and another node (e.g., 234) that shows where in that clause the function *f* is applied.

Referring back to FIG. 1, it can be desired to prove the conjecture 106 true or false based on the set of axioms 108. As described herein, the proof system 102 can facilitate such proof, by processing the set of DAGs 104 based on name-invariant learned embeddings.

In various embodiments, the proof system 102 can comprise a processor 112 (e.g., computer processing unit, microprocessor) and a non-transitory computer-readable memory 114 that is operably or operatively or communicatively connected or coupled to the processor 112. The non-transitory computer-readable memory 114 can store computer-executable instructions which, upon execution by the processor 112, can cause the processor 112 or other components of the proof system 102 (e.g., access component 116, aggregation component 118, embedding component 120, proof component 122, result component 124) to perform one or more acts. In various embodiments, the non-transitory computer-readable memory 114 can store computer-executable components (e.g., access component 116, aggregation component 118, embedding component 120, proof component 122, result component 124), and the processor 112 can execute the computer-executable components.

In various embodiments, the proof system 102 can comprise an access component 116. In various aspects, the access component 116 can electronically receive or otherwise electronically access the set of DAGs 104. In various instances, the access component 116 can electronically retrieve the set of DAGs 104 from any suitable centralized or decentralized data structures (not shown) or from any suitable centralized or decentralized computing devices (not shown). In any case, the access component 116 can electronically obtain or access the set of DAGs 104, such that other components of the proof system 102 can electronically interact with the set of DAGs 104.

In various embodiments, the proof system 102 can comprise an aggregation component 118. In various aspects, as described herein, the aggregation component 118 can combine the set of DAGs 104 into a unified DAG.

In various embodiments, the proof system 102 can comprise an embedding component 120. In various instances, as described herein, the embedding component 120 can generate a learned embedding for the non-logical symbol 110, based on the unified DAG.

In various embodiments, the proof system 102 can comprise a proof component 122. In various cases, as described herein, the proof component 122 can generate a proof, via execution of a neural-guided ATP. In various aspects, the neural-guided ATP can leverage the learned embedding of the non-logical symbol 110 to generate the proof.

In various embodiments, the proof system 102 can comprise a result component 124. In various instances, as described herein, the result component 124 can share or render the proof on any suitable electronic display.

Figure 3:
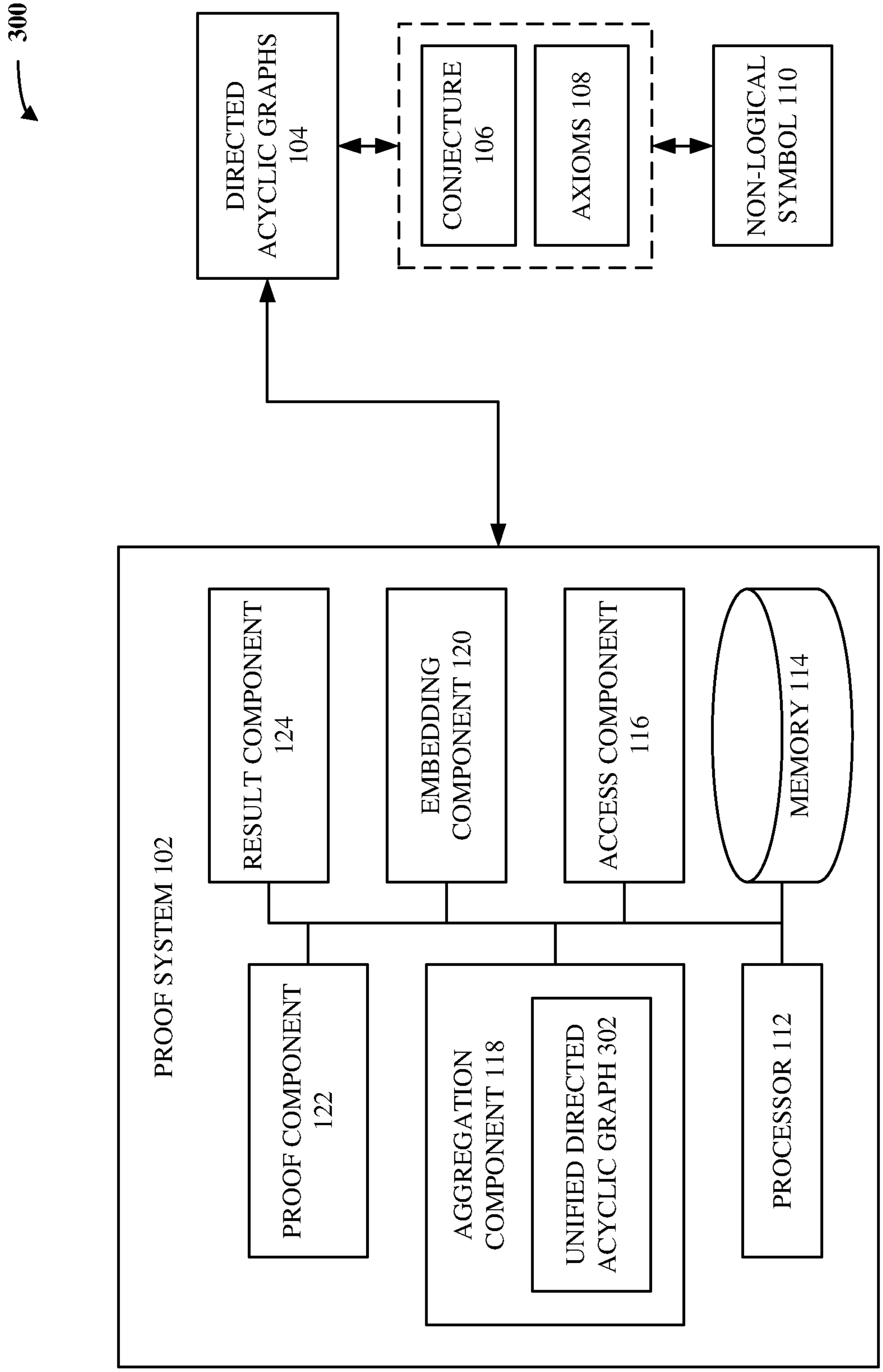
FIG. 3 illustrates a block diagram of an example, non-limiting system including a unified directed acyclic graph that facilitates name-invariant graph neural representations for automated theorem proving in accordance with one or more embodiments described herein.

FIG. 3 illustrates a block diagram of an example, non-limiting system 300 including a unified directed acyclic graph that can facilitate name-invariant graph neural representations for automated theorem proving in accordance with one or more embodiments described herein. As shown, the system 300 can, in some cases, comprise the same components as the system 100, and can further comprise a unified directed acyclic graph 302 (hereafter "unified DAG 302").

In various embodiments, the aggregation component 118 can electronically generate the unified DAG 302 by combining or aggregating together the set of DAGs 104. Thus, the unified DAG 302 can be considered as a combination, aggregation, or amalgamation of the set of DAGs 104.

More specifically, the aggregation component 118 can electronically insert each of the set of DAGs 104 into an initially-empty common graph structure. At such point, although each of the set of DAGs 104 would be within the common graph structure, they would all still be separate, independent, or disconnected from each other (e.g., having no edges between them).

In various aspects, the aggregation component 118 can electronically insert into the common graph structure a conjunction node, and the aggregation component 118 can couple that newly-inserted conjunction node to the root node of each of the set of DAGs 104. In particular, the newly-inserted conjunction node can be coupled to the root node of each of the set of DAGs 104 via a respective directed edge that leads away from the conjunction node and toward that root node. At such point, the set of DAGs 104 can no longer be considered as separate, independent, or disconnected from each other. Instead, they can all be connected or coupled to each other via the newly-inserted conjunction node. Accordingly, the newly-inserted conjunction node can be considered as a root node of the common graph structure.

Furthermore, at such point, the common graph structure can contain two or more instances of whatever node represents the name of the non-logical symbol 110. Indeed, as mentioned above, for any logical clause (e.g., the conjecture 106, any of the set of axioms 108) that contains the non-logical symbol 110, whichever of the set of DAGs 104 that represents that logical clause can contain one node that represents the name of the non-logical symbol 110 and one or more anonymized nodes that represent where the non-logical symbol 110 is applied. Because the non-logical symbol 110 can be present in two or more of the conjecture 106 or of the set of axioms 108, the node representing the name of the non-logical symbol 110 can be present in two or more of the set of DAGs 104. Thus, two or more instances of that node can now be present in the common graph structure. In various aspects, the aggregation component 118 can accordingly collapse such two or more instances of that node together. Note that, after such collapsing, that node can now be considered as being a leaf node that is shared between two or more of the set of DAGs 104 (e.g., whichever two or more DAGs represent the logical clauses that contain the non-logical symbol 110).

At such point, the common graph structure can be considered as being made up of the set of DAGs 104, where all of the set of DAGs 104 are coupled at a root-side by the newly-inserted conjunction node, and where two or more of the set of DAGs 104 are coupled at a leaf-side by the node representing the name of the non-logical symbol 110. Such common graph structure can be considered as the unified DAG 302. Note that the unified DAG 302 can be considered as representing all of the set of DAGs 104, and thus as representing the entire or total structural context of the conjecture 106 and of the set of axioms 108.

Note that, as mentioned above, various embodiments described herein can be applied to any suitable number of non-logical symbols. Indeed, in the conjunctive normal form, after an equivalence-preserving variable renaming, the unified DAG 302 can be such that the only shared nodes across the set of DAGs 104 are the newly-inserted conjunction node and whatever nodes represent the names of non-logical symbols that are each implemented in multiple respective ones of the set of DAGs 104 (e.g., can be the names of constants, of predicates, or of functions that are each recited in more than two respective logical clauses). To see why, first note that universal quantifiers (which are implied in the conjunctive normal formal) distribute over conjunctions. Thus, top level universal quantifiers can be pushed inside each logical clause. That is, for any suitable positive integers s and t, it can be the case that $[\forall X_1, \ldots, X_s: \text{Clause}_1 \wedge \ldots \wedge \text{Clause}_t][(\forall X_1, \ldots, X_s: \text{Clause}_1) \wedge \ldots A (\forall X_1, \ldots, X_s: \text{Clause}_t)]$. Variables can then be safely renamed in such a way that two distinct logical clauses do not have any common variables. Therefore, the only shared symbols between clauses would thus be names of constants, of functions, or of predicates.

Figure 4:
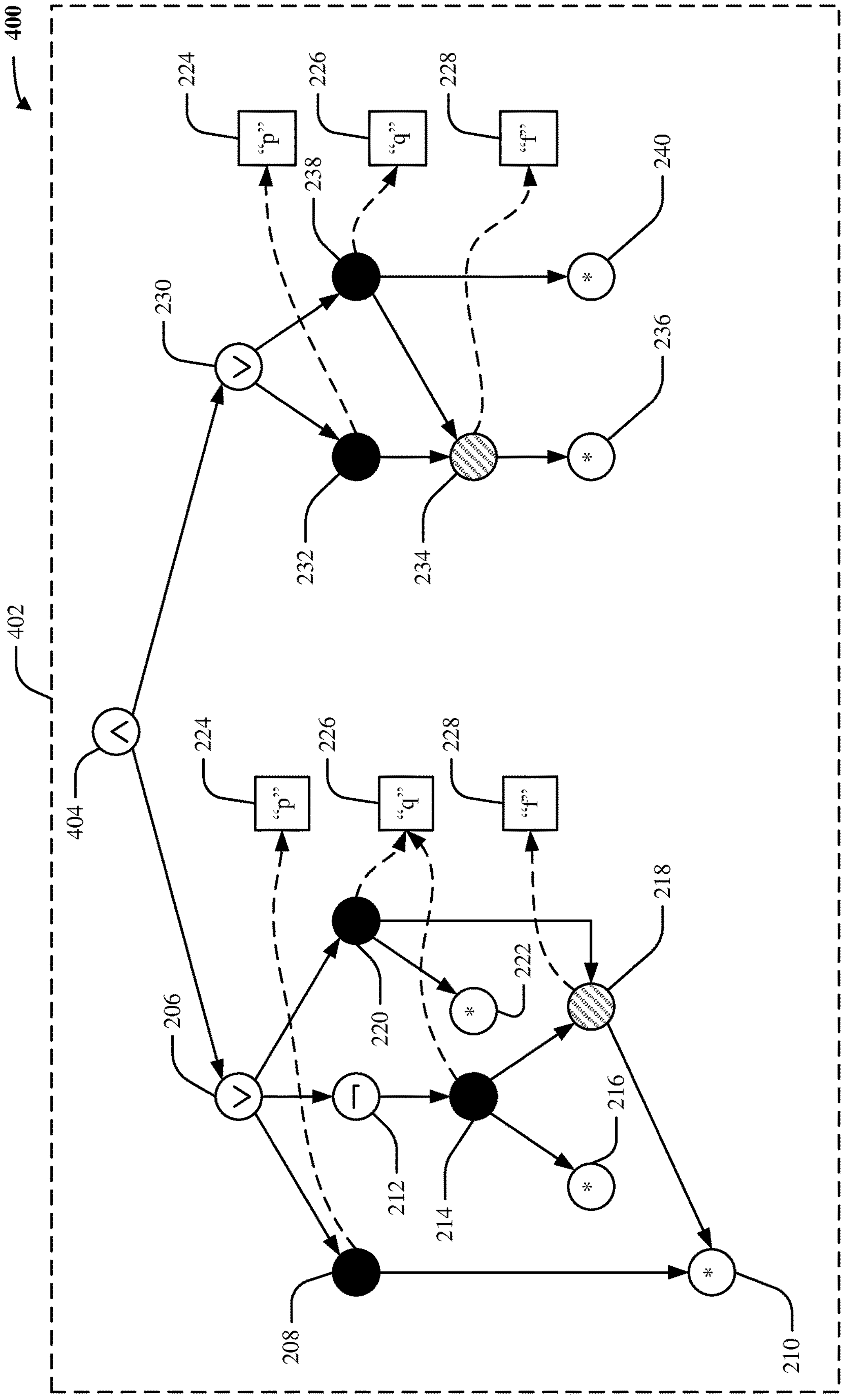
FIGS. 4-5 illustrate example, non-limiting block diagrams showing how a unified directed acyclic graph can be generated from disconnected directed acyclic graphs in accordance with one or more embodiments described herein.
Figure 5:
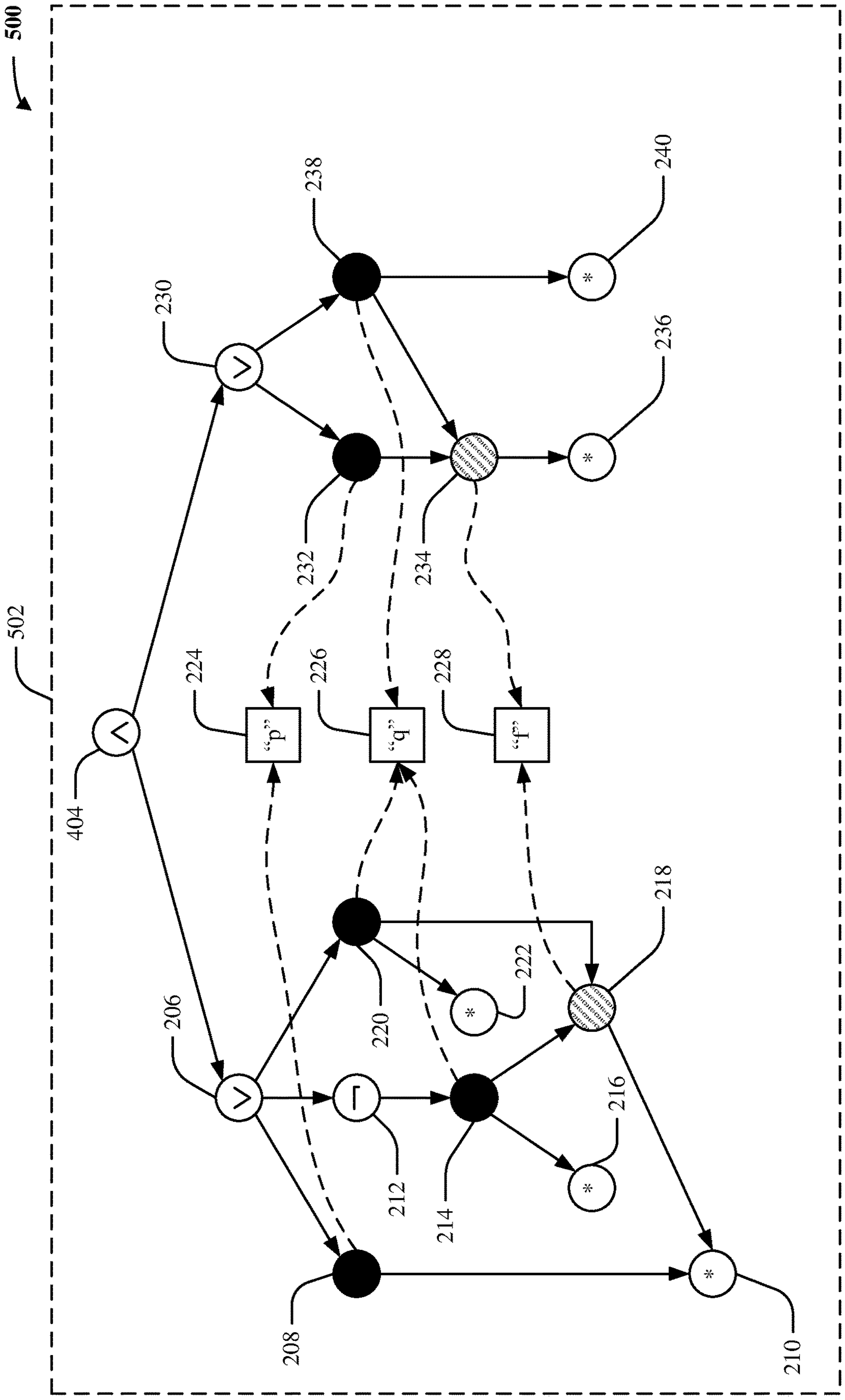

Non-limiting aspects are described with respect to FIGS. 4-5.

FIGS. 4-5 illustrate example, non-limiting block diagrams 400 and 500 showing how a unified DAG can be generated from disconnected DAGs in accordance with one or more embodiments described herein.

In the non-limiting example of FIGS. 4-5, just as in the non-limiting example of FIG. 2, the set of DAGs 104 can be considered as comprising the DAG 202 and the DAG 204. In various aspects, as shown in FIG. 4, the aggregation component 118 can insert the DAG 202 and the DAG 204 into a common graph structure 402. Moreover, as shown in FIG. 4, the aggregation component 118 can insert into the common graph structure 402 a conjunction node 404, and the aggregation component 118 can couple the conjunction node 404 to the root node (e.g., 206) of the DAG 202 and to the root node (e.g., 230) of the DAG 204 with outbound directed edges.

Note that, at such point, the common graph structure 402 can contain multiple instances of the naming node 224. After all, the DAG 202 can contain a first instance of the naming node 224 that is coupled to the anonymized predicate node 208, and the DAG 204 can contain a second instance of the naming node 224 that is coupled to the anonymized predicate node 232. Similarly, at such point, the common graph structure 402 can contain multiple instances of the naming node 226. After all, the DAG 202 can contain a first instance of the naming node 226 that is coupled to the anonymized predicate nodes 214 and 220, and the DAG 204 can contain a second instance of the naming node 226 that is coupled to the anonymized predicate node 238. Likewise, at such point, the common graph structure 402 can contain multiple instances of the naming node 228. After all, the DAG 202 can contain a first instance of the naming node 228 that is coupled to the anonymized function node 218, and the DAG 204 can contain a second instance of the naming node 228 that is coupled to the anonymized function node 234.

So, in various aspects, the aggregation component 118 can respectively collapse such multiple instances of nodes together, thereby yielding a collapsed common graph structure 502 as shown in FIG. 5. Indeed, as shown, the collapsed common graph structure 502 does not include two separate instances of the naming node 224, one of which is coupled to the anonymized predicate node 208 and the other of which is coupled to the anonymized predicate node 232. Instead, the collapsed common graph structure 502 can include a single instance of the naming node 224 that is coupled to both the anonymized predicate nodes 208 and 232. Likewise, as shown, the collapsed common graph structure 502 does not include two separate instances of the naming node 226, one of which is coupled to the anonymized predicate nodes 214 and 220 and the other of which is coupled to the anonymized predicate node 238. Instead, the collapsed common graph structure 502 can include a single instance of the naming node 226 that is coupled to all of the anonymized predicate nodes 214, 220, and 238. Similarly, as shown, the collapsed common graph structure 502 does not include two separate instances of the naming node 228, one of which is coupled to the anonymized function node 218 and the other of which is coupled to the anonymized function node 234. Instead, the collapsed common graph structure 502 can include a single instance of the naming node 228 that is coupled to both of the anonymized function nodes 218 and 234.

Accordingly, as shown in FIG. 5, the DAG 202 and the DAG 204 can, in the collapsed common graph structure 502, be considered as sharing a newly-inserted root node (e.g., the conjunction node 404) and as sharing newly-collapsed leaf nodes (e.g., the collapsed instances of the naming nodes 224, 226, and 228).

In various cases, the collapsed common graph structure 502 can be considered as a non-limiting embodiment of the unified DAG 302, when the set of DAGs 104 comprises the DAG 202 and the DAG 204.

Figure 6:
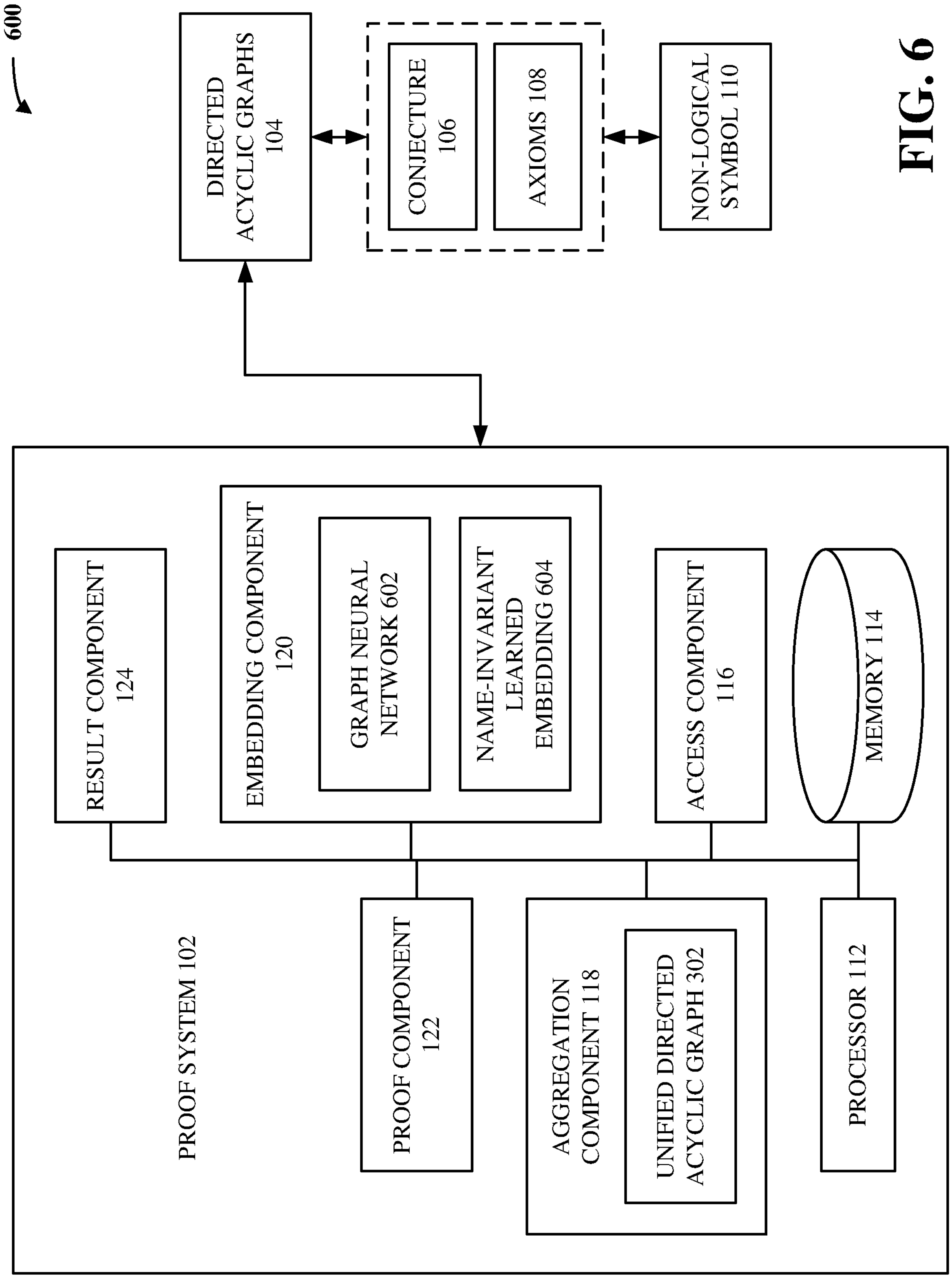
FIG. 6 illustrates a block diagram of an example, non-limiting system including a graph neural network and a name-invariant learned embedding that facilitates name-invariant graph neural representations for automated theorem proving in accordance with one or more embodiments described herein.

FIG. 6 illustrates a block diagram of an example, non-limiting system 600 including a graph neural network and a name-invariant learned embedding that can facilitate name-invariant graph neural representations for automated theorem proving in accordance with one or more embodiments described herein. As shown, the system 600 can, in some cases, comprise the same components as the system 300, and can further comprise a graph neural network 602 (hereafter "GNN 602") and a name-invariant learned embedding 604.

In various embodiments, the embedding component 120 can electronically store, electronically maintain, electronically control, or otherwise electronically access the GNN 602. In various aspects, the GNN 602 can have or otherwise exhibit any suitable geometric deep learning internal architecture. For instance, the GNN 602 can have an input layer, one or more hidden layers, and an output layer. In various instances, any of such layers can be coupled together by any suitable interlayer connections, such as forward connections, skip connections, or recurrent connections. Furthermore, in various cases, any of such layers can be any suitable types of graph neural network layers having any suitable learnable or trainable internal parameters. For example, any of such input layer, one or more hidden layers, or output layer can be message passing layers, graph convolutional layers, or attention layers whose learnable or trainable internal parameters can be convolutional kernels, weight matrices, or bias vectors. Further still, in various cases, any of such layers can be any suitable types of graph neural network layers having any suitable fixed or non-trainable internal parameters. For example, any of such input layer, one or more hidden layers, or output layer can be non-linearity layers or pooling layers.

In any case, the GNN 602 can be configured to receive as input a graph data structure and to produce as output learned embeddings respectively corresponding to the nodes of that inputted graph data structure. Accordingly, the embedding component 120 can electronically execute the GNN 602 on the unified DAG 302, which can yield a respective learned embedding for each node of the unified DAG 302. In various aspects, after collapsing as described above, there can be a single instance within the unified DAG 302 of the node that represents the name of the non-logical symbol 110. In various instances, whichever learned embedding generated by the GNN 602 that corresponds to that node can be considered as the name-invariant learned embedding 604. Various non-limiting aspects are described with respect to FIGS. 7-8.

Figure 7:
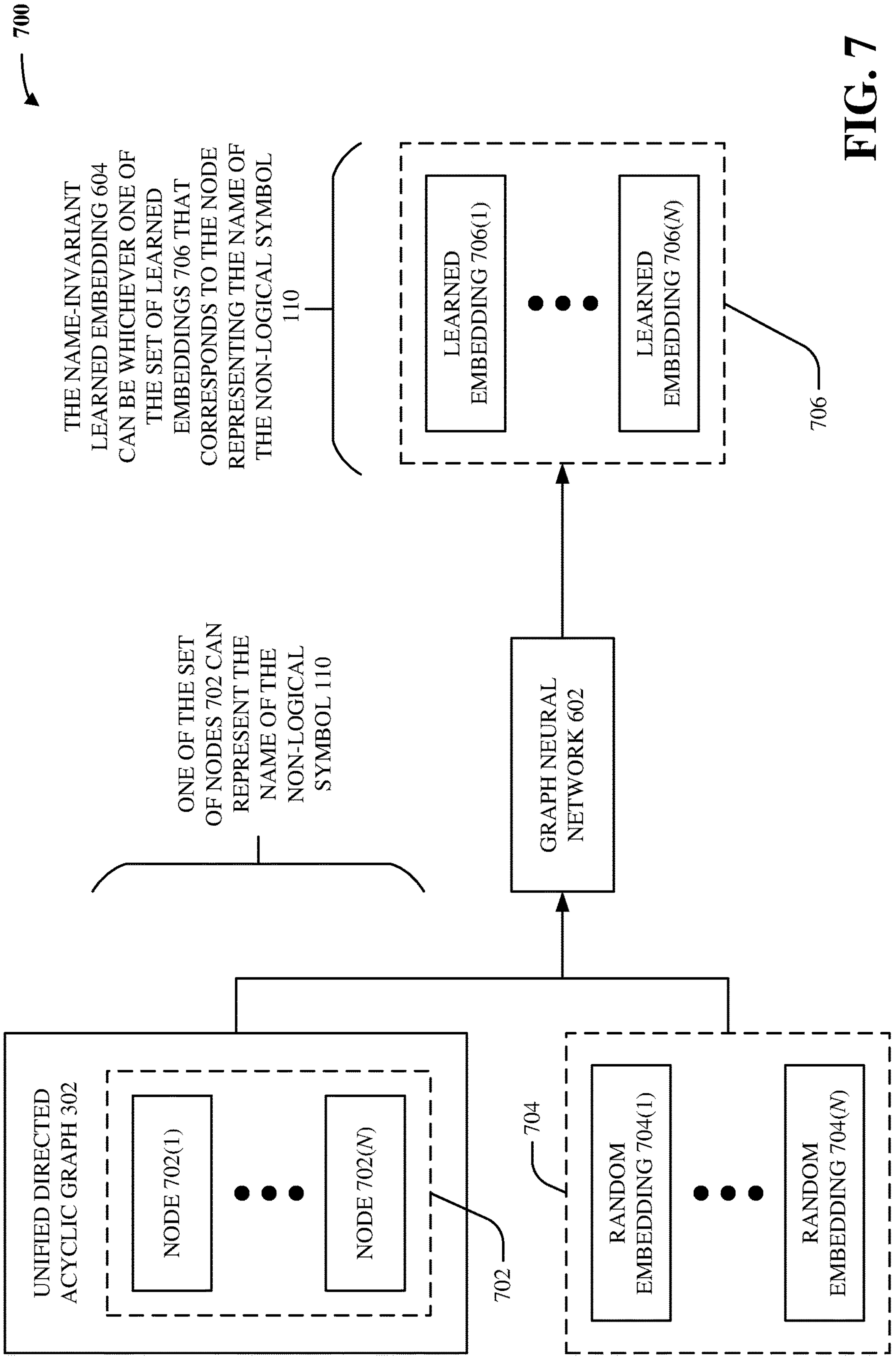
FIGS. 7-8 illustrate example, non-limiting block diagrams showing how a name-invariant learned embedding can be generated in accordance with one or more embodiments described herein.
Figure 8:
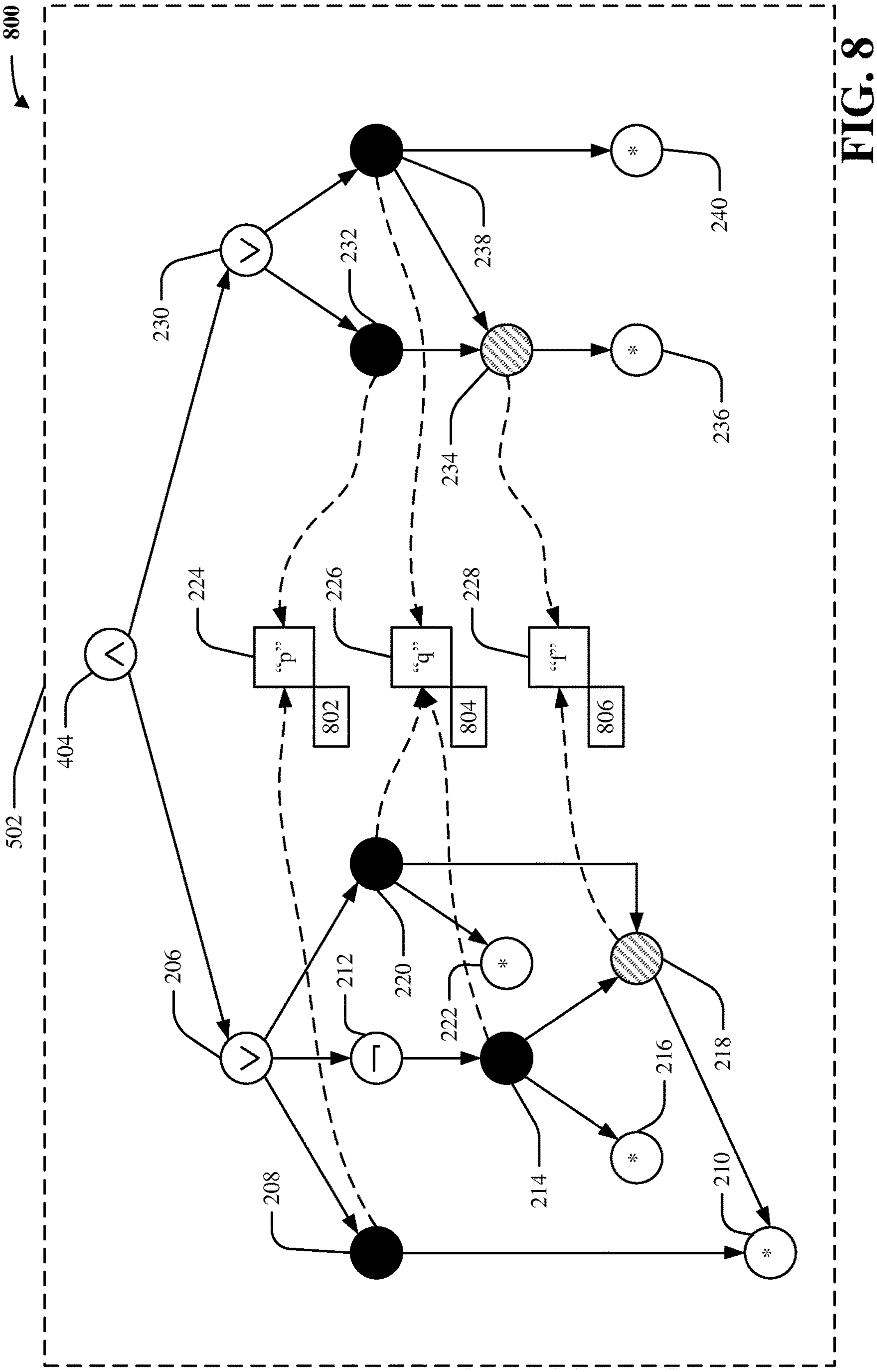

FIGS. 7-8 illustrate example, non-limiting block diagrams 700 and 800 showing how the name-invariant learned embedding 604 can be generated in accordance with one or more embodiments described herein.

First, consider FIG. 7. In various aspects, the unified DAG 302 can be considered as comprising a set of nodes 702. In various instances, the set of nodes 702 can comprise n nodes for any suitable positive integer n: a node 702(1) to a node **702(*n*). In various cases, there can be a set of random embeddings 704 that respectively correspond (e.g., in one-to-one fashion) to the set of nodes 702. Accordingly, since the set of nodes 702 can comprise n nodes, the set of random embeddings 704 can comprise n embeddings: a random embedding 704(1) to a random embedding 704(*n*). In various aspects, each of the set of random embeddings 704 can be considered as a real-valued vector of fixed length that the embedding component 120 has initially randomly generated for a respective one of the set of nodes 702. As a non-limiting example, the random embedding 704(1) can be some first real-valued random vector of length 1, for any suitable positive integer 1, that the embedding component 120 has initially assigned to the node 702(1). As another non-limiting example, the random embedding 704(*n*) can be some n-th real-valued random vector of length 1 that the embedding component 120 has initially assigned to the node 702(*n*)**.

In various aspects, the embedding component 120 can electronically execute the GNN 602 on the unified DAG 302 and on the set of random embeddings 704. In various cases, such execution can cause the GNN 602 to generate as output a set of learned embeddings 706. More specifically, the embedding component 120 can feed the unified DAG 302 and the set of random embeddings 704 to an input layer of the GNN 602. In various aspects, the unified DAG 302 and the set of random embeddings 704 can complete a forward pass through one or more hidden layers of the GNN 602. In various instances, an output layer of the GNN 602 can compute or otherwise calculate the set of learned embeddings 706 based on activation maps generated by the one or more hidden layers of the GNN 602.

In any case, the set of learned embeddings 706 can respectively correspond (e.g., in one-to-one fashion) to the set of nodes 702 and to the set of random embeddings 704. Thus, since the set of nodes 702 can comprise n nodes, and since the set of random embeddings 704 can comprise n embeddings, the set of learned embeddings 706 can likewise comprise n embeddings: a learned embedding 706(1) to a learned embedding **706(*n*). In various aspects, each of the set of learned embeddings 706 can be considered as a latent vector representation that the GNN 602 has inferred or predicted for a respective one of the set of nodes 702, based on the set of random embeddings 704 and based on the structure of the unified DAG 302. As a non-limiting example, the learned embedding 706(1) can be a real-valued vector of length l that the GNN 602 has predicted or inferred for the node 702(1). So, the learned embedding 706(1) can be considered as quantifying, within the encoding or latent space of the GNN 602, how the node 702(1) relates to all of the other nodes in the unified DAG 302. As another non-limiting example, the learned embedding 706(*n*) can be a real-valued vector of length l that the GNN 602 has predicted or inferred for the node 702(*n*). Thus, the learned embedding 706(*n*) can be considered as quantifying, within the encoding or latent space of the GNN 602, how the node 702(*n*) relates to all of the other nodes in the unified DAG 302**.

In various aspects, as mentioned above, one of the set of nodes 702 can (e.g., due to the above-mentioned collapsing) be considered as representing the name of the non-logical symbol 110. Accordingly, one of the set of learned embeddings 706 can be considered as corresponding to (e.g., as being a latent vector representation of) the node that represents the name of the non-logical symbol 110. In various cases, that learned embedding can be considered or referred to as the name-invariant learned embedding 604. In various aspects, the term "name-invariant" can be appropriate, because the content of the name-invariant learned embedding 604 can be not dictated by or sensitive to the name of the non-logical symbol 110. After all, the GNN 602 can generate the set of learned embeddings 706 based on the set of random embeddings 704 and based on the structure of the unified DAG 302. The structure of the unified DAG 302 is not in any way dependent upon the name of the non-logical symbol 110 (e.g., the name of the non-logical symbol 110 could be changed to anything as desired, but such change would, by itself, not alter the structure or topology of the unified DAG 302). Likewise, the set of random embeddings 704 are randomly generated and are not in any way dependent upon the name of the non-logical symbol 110 (e.g., the name of the non-logical symbol 110 could be changed to anything as desired, but such change would, by itself, not alter whichever random embedding is initially assigned to the node representing the name of the non-logical symbol 110).

In any case, the name-invariant learned embedding 604 can be considered as being a latent vector representation of the node corresponding to the name of the non-logical symbol 110. In other words, the name-invariant learned embedding 604 can quantify or capture how the node corresponding to the name of the non-logical symbol 110 fits into the unified DAG 302, and thus how the non-logical symbol 110 fits into the entire or total structural context of the conjecture 106 and of the set of axioms 108. In other words, the name-invariant learned embedding 604 can capture or convey rich interdependency information pertaining to the non-logical symbol 110.

Now, consider FIG. 8. In various embodiments, as mentioned above, the collapsed common graph structure 502 can be considered as a non-limiting example of the unified DAG 302. In various aspects, the embedding component 120 can generate a respective random initial embedding for each node of the collapsed common graph structure 502 (e.g., for 404 and for each of 206-240). In various instances, the embedding component 120 can execute the GNN 602 on the collapsed common graph structure 502 and on those random node-wise embeddings. In various cases, such execution can cause the GNN 602 to produce as output a learned embedding for each node of the collapsed common graph structure 502 (e.g., for 404 and for each of 206-240).

In particular, whatever learned embedding that the GNN 602 outputs for the naming node 224 can be referred to as a learned embedding 802. Thus, the learned embedding 802 can be considered as quantifying the global role of the naming node 224 within the collapsed common graph structure 502 (e.g., within both the DAG 202 and the DAG 204). Likewise, whatever learned embedding that the GNN 602 outputs for the naming node 226 can be referred to as a learned embedding 804. That is, the learned embedding 804 can be considered as quantifying the global role of the naming node 226 within the collapsed common graph structure 502 (e.g., within both the DAG 202 and the DAG 204). Similarly, whatever learned embedding that the GNN 602 outputs for the naming node 228 can be referred to as a learned embedding 806. So, the learned embedding 806 can be considered as quantifying the global role of the naming node 228 within the collapsed common graph structure 502 (e.g., within both the DAG 202 and the DAG 204).

Although the GNN 602 can generate a respective learned embedding for every other remaining node of the collapsed common graph structure 502 (e.g., for 404, for 206-222, and for 230-240), such other other learned embeddings can be discarded or otherwise ignored. In contrast, the learned embeddings 802-806 can be stored or preserved.

In order for the learned embeddings produced by the GNN 602 to be accurate, the GNN 602 can first undergo training. In various aspects, the GNN 602 can be trained in any suitable fashion via any suitable training paradigm. As a non-limiting example, the GNN 602 can be trained in supervised fashion based on annotated data. As another non-limiting example, the GNN 602 can be trained in unsupervised fashion based on unannotated data. As even another non-limiting example, the GNN 602 can be trained in reinforcement learning fashion based on rewards or punishments. Regardless of the type or paradigm of such training, the trainable internal parameters (e.g., convolutional kernels, weight matrices, bias vectors) of the GNN 602 can be initialized in any suitable fashion (e.g., random initialization), and such training can cause those trainable internal parameters to become iteratively optimized (e.g., via backpropagation, such as through stochastic gradient descent) for accurately generating node-wise embeddings. Such training can involve any suitable training termination criteria, any suitable training batch sizes, or any suitable error, loss, or objective functions (e.g., mean absolute error, mean squared error, cross-entropy error). Note that, at the beginning or in the middle of such training, the outputs predicted or inferred by the GNN 602 can be highly or moderately inaccurate (e.g., can fail to properly or correctly embed nodes of inputted graphs).

Figure 9:
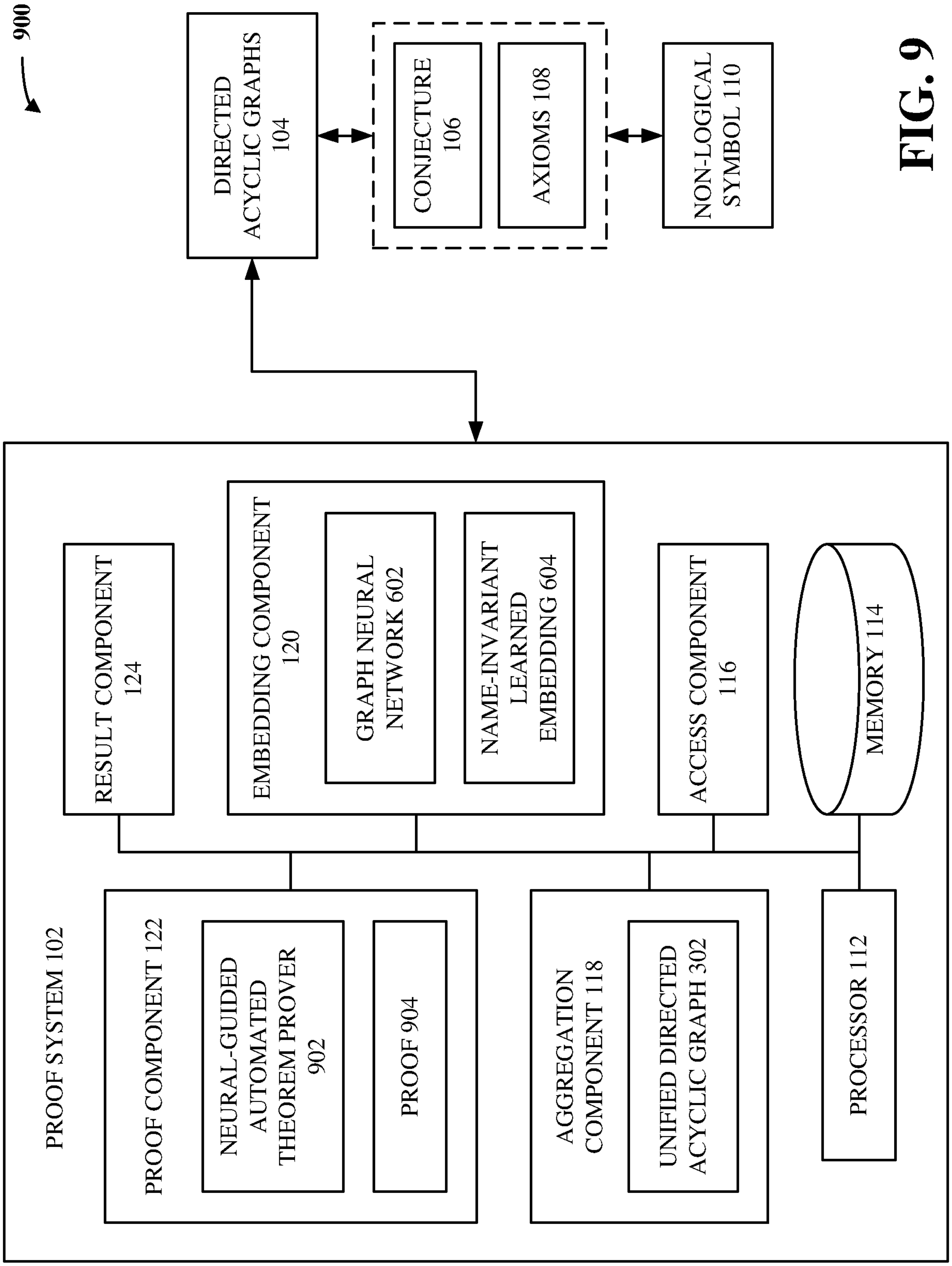
FIG. 9 illustrates a block diagram of an example, non-limiting system including a neural-guided automated theorem prover and a proof that facilitates name-invariant graph neural representations for automated theorem proving in accordance with one or more embodiments described herein.

FIG. 9 illustrates a block diagram of an example, non-limiting system 900 including a neural-guided automated theorem prover and a proof that can facilitate name-invariant graph neural representations for automated theorem proving in accordance with one or more embodiments described herein. As shown, the system 900 can, in some cases, comprise the same components as the system 600, and can further comprise a neural-guided automated theorem prover 902 (hereafter "neural-guided ATP 902") and a proof 904.

In various embodiments, the proof component 122 can electronically store, electronically maintain, electronically control, or otherwise electronically access the neural-guided ATP 902. In various aspects, the neural-guided ATP 902 can exhibit any suitable construction or architecture, such as a TRAIL architecture or a HER architecture. In various instances, the proof component 122 can execute the neural-guided ATP 902 on the set of DAGs 104, and the neural-guided ATP 902 can leverage or otherwise utilize the name-invariant learned embedding 604 in such execution. In various cases, such execution can yield the proof 904, which can be considered as a sequence of inferencing rule applications that proves the conjecture 106 true or false. Non-limiting aspects are described with respect to FIG. 10.

Figure 10:
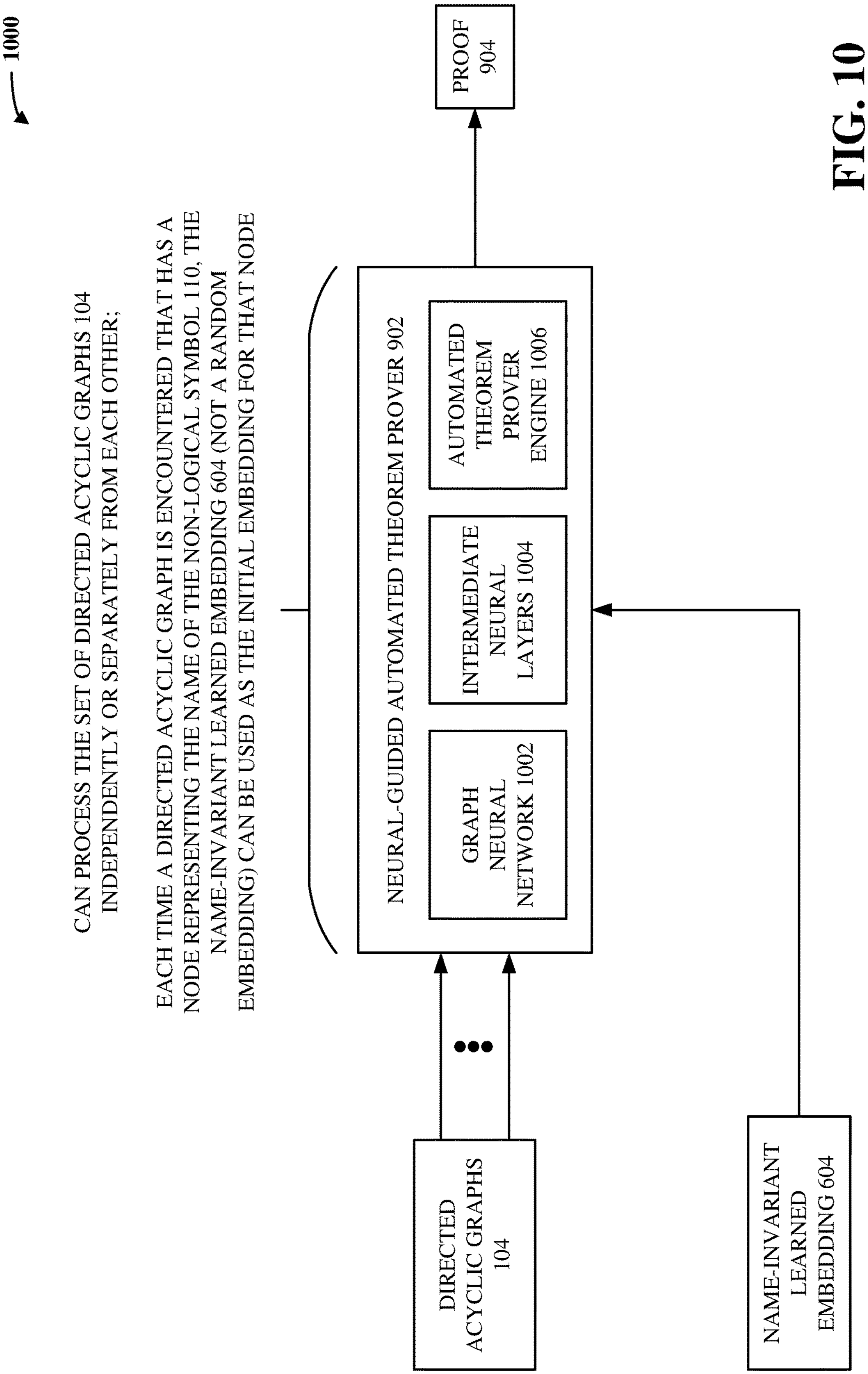
FIG. 10 illustrates an example, non-limiting block diagram showing how a neural-guided automated theorem prover can generate a proof based on a name-invariant learned embedding in accordance with one or more embodiments described herein.

FIG. 10 illustrates an example, non-limiting block diagram 1000 showing how the neural-guided ATP 902 can generate the proof 904 based on the name-invariant learned embedding 604 in accordance with one or more embodiments described herein.

In various aspects, the neural-guided ATP 902 can comprise a graph neural network 1002 (hereafter "GNN 1002"), one or more intermediate neural layers 1004, and an automated theorem prover engine 1006 (hereafter "ATP engine 1006").

In various instances, the GNN 1002 can have or otherwise exhibit any suitable geometric deep learning internal architecture. For instance, the GNN 1002 can have an input layer, one or more hidden layers, and an output layer. In various cases, any of such layers can be coupled together by any suitable interlayer connections, such as forward connections, skip connections, or recurrent connections. Furthermore, in various aspects, any of such layers can be any suitable types of graph neural network layers having any suitable learnable or trainable internal parameters. For example, any of such input layer, one or more hidden layers, or output layer can be message passing layers, graph convolutional layers, or attention layers whose learnable or trainable internal parameters can be convolutional kernels, weight matrices, or bias vectors. Further still, in various cases, any of such layers can be any suitable types of graph neural network layers having any suitable fixed or non-trainable internal parameters. For example, any of such input layer, one or more hidden layers, or output layer can be non-linearity layers or pooling layers.

In any case, the GNN 1002 can be configured to receive as input a graph data structure and to produce as output a learned embedding corresponding to that inputted graph data structure. In other words, the GNN 1002 can be configured to predict or infer graph-wise embeddings instead of node-wise embeddings. Regardless, the GNN 1002 can function similarly to the GNN 602. That is, an input layer of the GNN 1002 can receive a graph and initial embeddings corresponding to the nodes of that graph, such graph and initial embeddings can complete a forward pass through one or more hidden layers of the GNN 1002, and an output layer of the GNN 1002 can compute a learned embedding for that graph, based on activation maps provided by the one or more hidden layers of the GNN 1002. Just as with the GNN 602, the GNN 1002 can be trained according to any suitable paradigm (e.g., supervised training, unsupervised training, reinforcement learning).

In various aspects, one or more intermediate neural layers 1004 can comprise any suitable number of any suitable types of neural network layers that can be downstream of the GNN 1002 and that can thus process whatever graph-wise learned embeddings are computed by the GNN 1002. As a non-limiting example, the one or more intermediate neural layers 1004 can be or otherwise amount to an attention-based reinforcement learning policy network (or a portion thereof) that can learn a stochastic or probabilistic mapping between graph-wise embeddings of logical clauses and inferencing rule applications. In such case, the one or more intermediate neural layers 1004 can comprise one or more attention layers that can compute attention scores between already-processed logical clauses and not-yet-processed logical clauses. In various aspects, the one or more intermediate neural layers 1004 can further comprise an average pooling layer that can be downstream of such attention layers. In various instances, the one or more intermediate neural layers 1004 can further comprise a softmax layer that can be downstream of the average pooling layer. In various cases, the softmax layer can be considered as producing an action distribution that stochastically links graph-wise embeddings to inferencing rule applications. In various aspects, the one or more intermediate neural layers 1004 can implement any suitable temperature parameter, which can be considered as controlling the trade-off between exploration and exploitation of inferencing rule applications. In various instances, the temperature parameter can decay throughout iterations, so as to promote exploitation over time. In various cases, any suitable reward or punishment function can be implemented (e.g., can be based on amount of time or number of inferencing rule applications consumed in generating a proof).

In various aspects, the ATP engine 1006 can be downstream of the one or more intermediate neural layers 1004. In various instances, the ATP engine 1006 can exhibit any suitable ATP architecture that can perform a proof search according to outputs computed by the one or more intermediate neural layers 1004 (e.g., according to an action distribution produced by an attention-based reinforcement learning policy network). For instance, the ATP engine 1006 can be a proof-heuristic-based ATP whose proof heuristics are deactivated, such that the ATP engine 1006 is guided by the outputs (e.g., action distributions) of the one or more intermediate neural layers 1004. As a non-limiting example, the ATP engine 1006 can be E prover, where the proof heuristics of E prover have been deactivated or turned off. As another non-limiting example, the ATP engine 1006 can be Vampire prover, where the proof heuristics of Vampire prover have been deactivated or turned off.

In any case, the neural-guided ATP 902 can be executed on the set of DAGs 104, and the neural-guided ATP 902 can, during such execution, utilize or leverage the name-invariant learned embedding 604. In various aspects, the neural-guided ATP 902 can independently or separately process each of the set of DAGs 104. More specifically, the GNN 1002 can create a separate or distinct learned graph-wise embedding for each of the set of DAGs 104. Those learned graph-wise embeddings can then be iteratively analyzed by the one or more intermediate neural layers 1004, so as to produce an action distribution that is pertinent to the conjecture 106 and to the set of axioms 108 (e.g., the one or more intermediate neural layers 1004 can compute attention scores between processed and unprocessed pairs of the set of DAGs 104). Accordingly, the ATP engine 1006 can iteratively apply inferencing rules to the set of DAGs 104, based on the action distributions produced by the one or more intermediate neural layers 1004. Note that inferencing rule applications performed by the ATP engine 1006 can yield new DAGs. Accordingly, whenever a new DAG is encountered or derived, that new DAG can be embedded by the GNN 1002, and such embedding can be used by the one or more intermediate neural layers 1004 to update the action distributions that are fed to the ATP engine 1006.

Now, as mentioned above, the GNN 1002 can separately or independently embed the set of DAGs 104 (or any new DAGs derived by the ATP engine 1006). In various aspects, the GNN 1002 can require some initial node-wise embeddings for each received DAG in order to generate learned graph-wise embeddings. In various instances, many of such initial node-wise embeddings can be randomly generated by the proof component 122. However, whenever a DAG is encountered that contains the node that represents the name of the non-logical symbol 110, the initial embedding of that node can be not randomly generated (but the initial embedding of other nodes in that DAG can be randomly generated). Instead, the name-invariant learned embedding 604 can be treated or supplied as the initial embedding for that node. As mentioned above, the name-invariant learned embedding 604 can be considered as quantifying or capturing rich interdependency information pertaining to the non-logical symbol 110. Thus, by leveraging the name-invariant learned embedding 604 as the initial node-wise embedding whenever the node corresponding to the name of the non-logical symbol 110 is encountered by the neural-guided ATP 902, the learned graph-wise embeddings produced by the GNN 1002 can be considered as reflecting such rich interdependency information. This can be notwithstanding that the set of DAGs 104 (and any new DAGs derived by the ATP engine 1006) are processed separately or independently of each other. In this way, the best of all worlds can be achieved: efficient computation, due to independent processing of the set of DAGs 104 (and of any newly-derived DAGs); representation of rich interdependency information notwithstanding such independent processing, due to the name-invariant learned embedding 604; and no name-sensitivity, due to the how the name-invariant learned embedding 604 can be generated.

As mentioned above, various embodiments described herein can be applied or extended to multiple non-logical symbols that are each present in two or more respective ones of the set of DAGs 104. In such cases, a respective name-invariant learned embedding can be generated for each of those multiple non-logical symbols based on the unified DAG 302, and those name-invariant learned embeddings can be used as respective initial embeddings during independent processing by the neural-guided ATP 902.

As a non-limiting example, consider again the DAG 202. In various aspects, the DAG 202 can be independently embedded, separately from the DAG 204, by the GNN 1002. For such embedding, the nodes 206-222 can be initially assigned random embeddings by the proof component 122 (e.g., since the nodes 206-222 do not represent names of non-logical symbols that are present in more than one DAG). However, the proof component 122 can refrain from initially assigning random embeddings to the naming nodes 224, 226, and 228 (e.g., since the naming nodes 224-228 do represent names of non-logical symbols that are present in more than one DAG). Instead, the learned embedding 802 can be used as the initial embedding for the naming node 224. Similarly, the learned embedding 804 can be used as the initial embedding for the naming node 226. Likewise, the learned embedding 806 can be used as the initial embedding for the naming node 228. In this way, the learned graph-wise embedding that is generated by the GNN 1002 for the DAG 202 can reflect the interdependencies that the naming nodes 224, 226, and 228 have with respect to the DAG 204.

As another non-limiting example, consider again the DAG 204. In various aspects, the DAG 204 can be independently embedded, separately from the DAG 202, by the GNN 1002. For such embedding, the nodes 230-240 can be initially assigned random embeddings by the proof component 122 (e.g., since the nodes 230-240 do not represent names of non-logical symbols that are present in more than one DAG). However, the proof component 122 can refrain from initially assigning random embeddings to the naming nodes 224, 226, and 228 (e.g., since the naming nodes 224-228 do represent names of non-logical symbols that are present in more than one DAG). Instead, the learned embedding 802 can be used as the initial embedding for the naming node 224. Similarly, the learned embedding 804 can be used as the initial embedding for the naming node 226. Likewise, the learned embedding 806 can be used as the initial embedding for the naming node 228. In this way, the learned graph-wise embedding that is generated by the GNN 1002 for the DAG 204 can reflect the interdependencies that the naming nodes 224, 226, and 228 have with respect to the DAG 202.

Although the herein disclosure mainly describes various embodiments in which a single instance of the neural-guided ATP 902 is implemented by the proof component 122 to generate the proof 904, this is a mere non-limiting example for ease of explanation. Indeed, in various aspects, an ensemble of instances of the neural-guided ATP 902 can be implemented by the proof component 122 so as to generate the proof 904. In various cases, such ensemble can include h instances of the neural-guided ATP 902, for any suitable positive integer h: a first instance of the neural-guided ATP 902 to an h-th instance of the neural-guided ATP 902. In various aspects, each of such h instances can be assigned a unique or distinct random trainable parameter initialization. As a non-limiting example, the trainable parameters of the first instance of the neural-guided ATP 902 (e.g., the weight matrices or bias vectors of the first instance of the GNN 1002 and of the first instance of the one or more intermediate neural layers 1004) can be assigned a first random initialization. As another non-limiting example, the trainable parameters of the h-th instance of the neural-guided ATP 902 (e.g., the weight matrices or bias vectors of the h-th instance of the GNN 1002 and of the h-th instance of the one or more intermediate neural layers 1004) can be assigned an h-th random initialization. Moreover, in various cases, each of such h instances can be set to unique or distinct proof search configuration options. As a non-limiting example, the literal selection strategy, the schedule mode, or the term ordering of the first instance of the neural-guided ATP 902 (e.g., of the first instance of the ATP engine 1006) can be set to a first unique or distinct configuration. As another non-limiting example, the literal selection strategy, the schedule mode, or the term ordering of the h-th instance of the neural-guided ATP 902 (e.g., of the h-th instance of the ATP engine 1006) can be set to an h-th unique or distinct configuration. In various aspects, such different configurations can be considered as providing a greater source of diverse proofs than relying only on different random parameter initializations.

In various cases, when given a total time limit T for each proof attempt, the ensemble of instances of the neural-guided ATP 902 can operate according to the following. Each of the h instances of the neural-guided ATP 902 can be trained, via reinforcement learning and in parallel and independently of each other, with a modified time limit of T/h. At a first iteration of training, the trainable internal parameters of each of the h instances of the neural-guided ATP 902 can be randomly initialized, and each of the h instances of the neural-guided ATP 902 can attempt to solve all problems within a training dataset within the modified time limit of T/h. A reward or punishment can then be computed based upon how many of the problems that the h instances of the neural-guided ATP 902 were able to collectively solve (e.g., based upon the union of solved problems during the first iteration), and the trainable internal parameters of each of the h instances of the neural-guided ATP 902 can be updated via backpropagation driven by that reward or punishment. Subsequent iterations can be performed in analogous fashion, thereby causing the trainable parameters of each instance of the neural-guided ATP 902 to become iteratively optimized for proof search.

In various embodiments, the result component 124 can initiate, perform, or otherwise facilitate any suitable electronic actions with respect to the proof 904. As a non-limiting example, the result component 124 can electronically render the proof 904 on any suitable electronic display (e.g., computer screen, computer monitor). As another non-limiting example, the result component 124 can electronically transmit the proof 904 to any other suitable computing device.

To help demonstrate technical benefits of various embodiments described herein, the present inventors conducted various experiments. During such experiments, the present inventors obtained two ATP validation datasets, each comprising a respective number of proof-based problems to be solved. Moreover, during such experiments, the present inventors reduced to practice a non-limiting embodiment of the proof system 102, executed (after training) that non-limiting embodiment on each of those two ATP validation datasets, with each execution being allotted a 100-second time budget. The present inventors then recorded the total number of proofs that the non-limiting embodiment was able to generate within that time budget for each ATP validation dataset. Furthermore, during such experiments, the present inventors likewise executed various baseline ATPs on each of those two ATP validation datasets, each also being allotted a 100-second time budget. In particular, six different baseline ATPs were implemented: two baseline proof-heuristics-based ATPs (e.g., E prover and Vampire prover); and four baseline neural-guided ATPs (e.g., rlCop, plCop, TRAIL, and HER).

The first ATP validation dataset contained a total of 2078 problems to be solved, some of which were known to be unsolvable by ATPs. E prover was able to solve 63.7% of those problems; Vampire prover was able to solve 73.0% of those problems; rlCop was able to solve 31.6% of those problems; plCop was able to solve 42.8% of those problems; TRAIL was able to solve 58.4% of those problems; HER was able to solve 68.5% of those problems; and the non-limiting embodiment of the proof system 102 was able to solve 75.5% of those problems. That is, the non-limiting embodiment of the proof system 102 was found to statistically significantly outperform all six of the baseline ATPs on the first ATP validation dataset.

The second ATP validation dataset contained a total of 2003 problems to be solved, all of which are known to be solvable by ATPs. E prover was able to solve 97% of those problems; Vampire prover was able to solve 99.0% of those problems; rlCop was able to solve 67.4% of those problems; plCop was able to solve 70.7% of those problems; TRAIL was able to solve 90.2% of those problems; HER was able to solve 94.6% of those problems; and the non-limiting embodiment of the proof system 102 was able to solve 98.0% of those problems. That is, the non-limiting embodiment of the proof system 102 was found to statistically significantly outperform all four of the baseline neural-guided ATPs and one of the baseline proof-heuristic-based ATPs on the second ATP validation dataset.

As these experimental results help to demonstrate, various embodiments described herein (e.g., utilizing name-invariant learned embeddings, instead of random embeddings, for non-logical symbol naming node initialization purposes) can yield significant real-world performance benefits (e.g., can solve more proof-based problems in a given time limit than state-of-the-art baseline techniques). Therefore, various embodiments described herein certainly constitute concrete and tangible technical improvements in the field of automated theorem proving.

Figure 11:
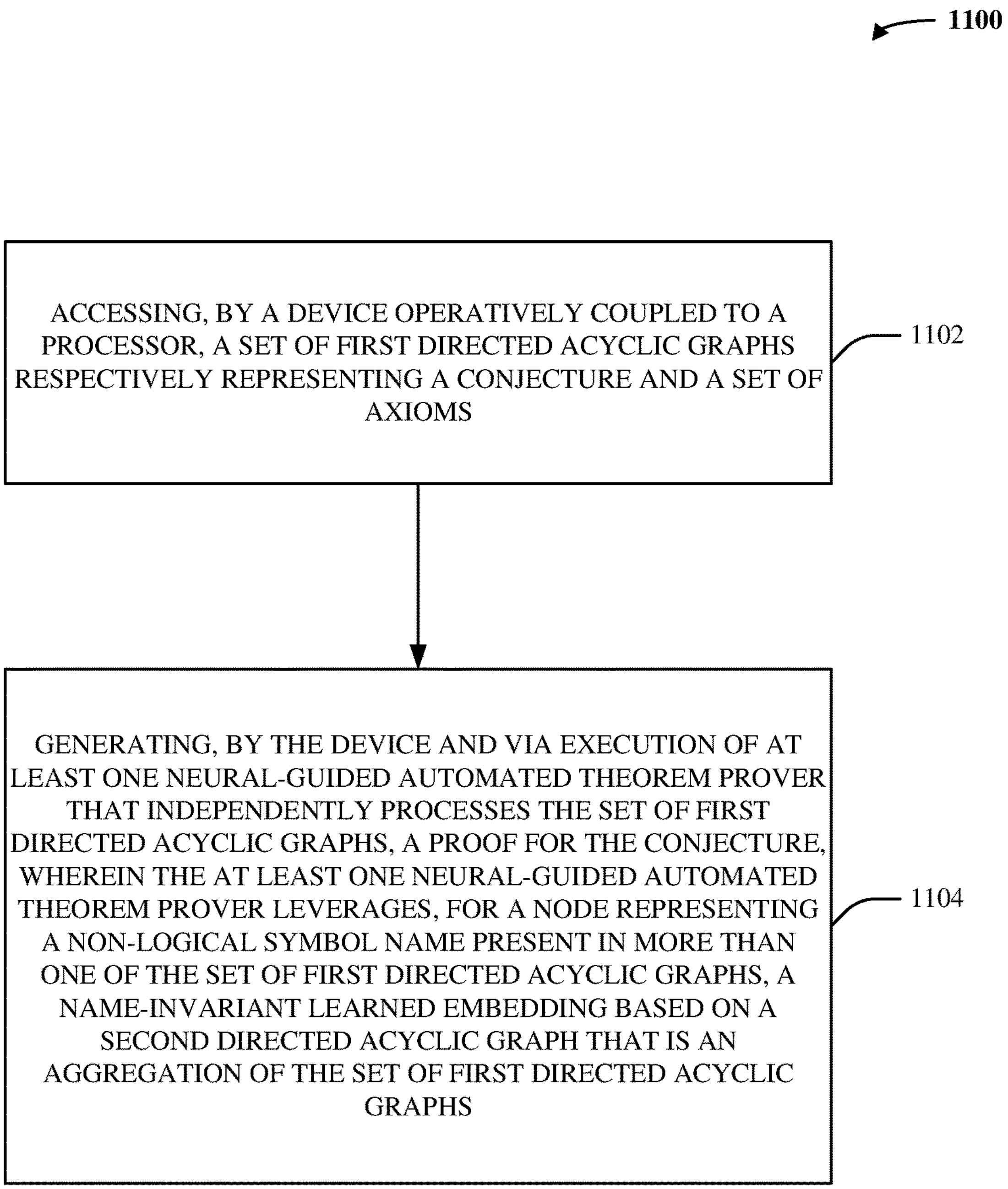
FIG. 11 illustrates a flow diagram of an example, non-limiting computer-implemented method that facilitates name-invariant graph neural representations for automated theorem proving in accordance with one or more embodiments described herein.

FIG. 11 illustrates a flow diagram of an example, non-limiting computer-implemented method 1100 that can facilitate name-invariant graph neural representations for automated theorem proving in accordance with one or more embodiments described herein. In various cases, the proof system 102 can facilitate the computer-implemented method 1100.

In various embodiments, act 1102 can include accessing, by a device (e.g., via 116) operatively coupled to a processor (e.g., 112), a set of first directed acyclic graphs (e.g., 104) respectively representing a conjecture (e.g., 106) and a set of axioms (e.g., 108).

In various aspects, act 1104 can include generating, by the device (e.g., via 122) and via execution of at least one neural-guided automated theorem prover (e.g., 902) that independently processes the set of first directed acyclic graphs, a proof (e.g., 904) for the conjecture. In various cases, the at least one neural-guided automated theorem prover can leverage, for a node representing a non-logical symbol name (e.g., name of 110) present in more than one of the set of first directed acyclic graphs, a name-invariant learned embedding (e.g., 604) based on a second directed acyclic graph (e.g., 302) that is an aggregation of the set of first directed acyclic graphs.

Although not explicitly shown in FIG. 11, the computer-implemented method 1100 can include: generating, by the device (e.g., via 118), the second directed acyclic graph, by combining the set of first directed acyclic graphs via a conjunction (e.g., 404), and by collapsing together repeated instances of the node representing the non-logical symbol name (e.g., as shown with respect to FIGS. 4-5).

Although not explicitly shown in FIG. 11, the computer-implemented method 1100 can include: feeding, by the device (e.g., via 120), the second directed acyclic graph and random embeddings (e.g., 704) respectively corresponding to nodes (e.g., 702) of the second directed acyclic graph as input to a graph neural network (e.g., 602). In various cases, the graph neural network can produce as output first learned embeddings (e.g., 706) respectively corresponding to the nodes of the second directed acyclic graph. In various instances, the name-invariant learned embedding can be whichever of the first learned embeddings corresponds to the node representing the non-logical symbol name (e.g., as shown with respect to FIG. 7).

Although not explicitly shown in FIG. 11, during independent processing of any of the set of first directed acyclic graphs in which the node representing the non-logical symbol name is present, the at least one neural-guided automated theorem prover can use, as an initial embedding for the node representing the non-logical symbol name, the name-invariant learned embedding instead of a random embedding (e.g., as described with respect to FIG. 10).

Although not explicitly shown in FIG. 11, the at least one neural-guided automated theorem prover can comprise an ensemble of neural-guided automated theorem provers, each of which can be set to a unique proof configuration (e.g., unique or distinct literal selection strategies, unique or distinct schedule modes, unique or distinct term orderings).

Although not explicitly shown in FIG. 11, the non-logical symbol name can be a name of a constant, of a function, or of a predicate that is present in the conjecture or in the set of axioms.

Although not explicitly shown in FIG. 11, the computer-implemented method 1100 can include: visually rendering, by the device (e.g., via 124), the proof on an electronic display.

Figure 12:
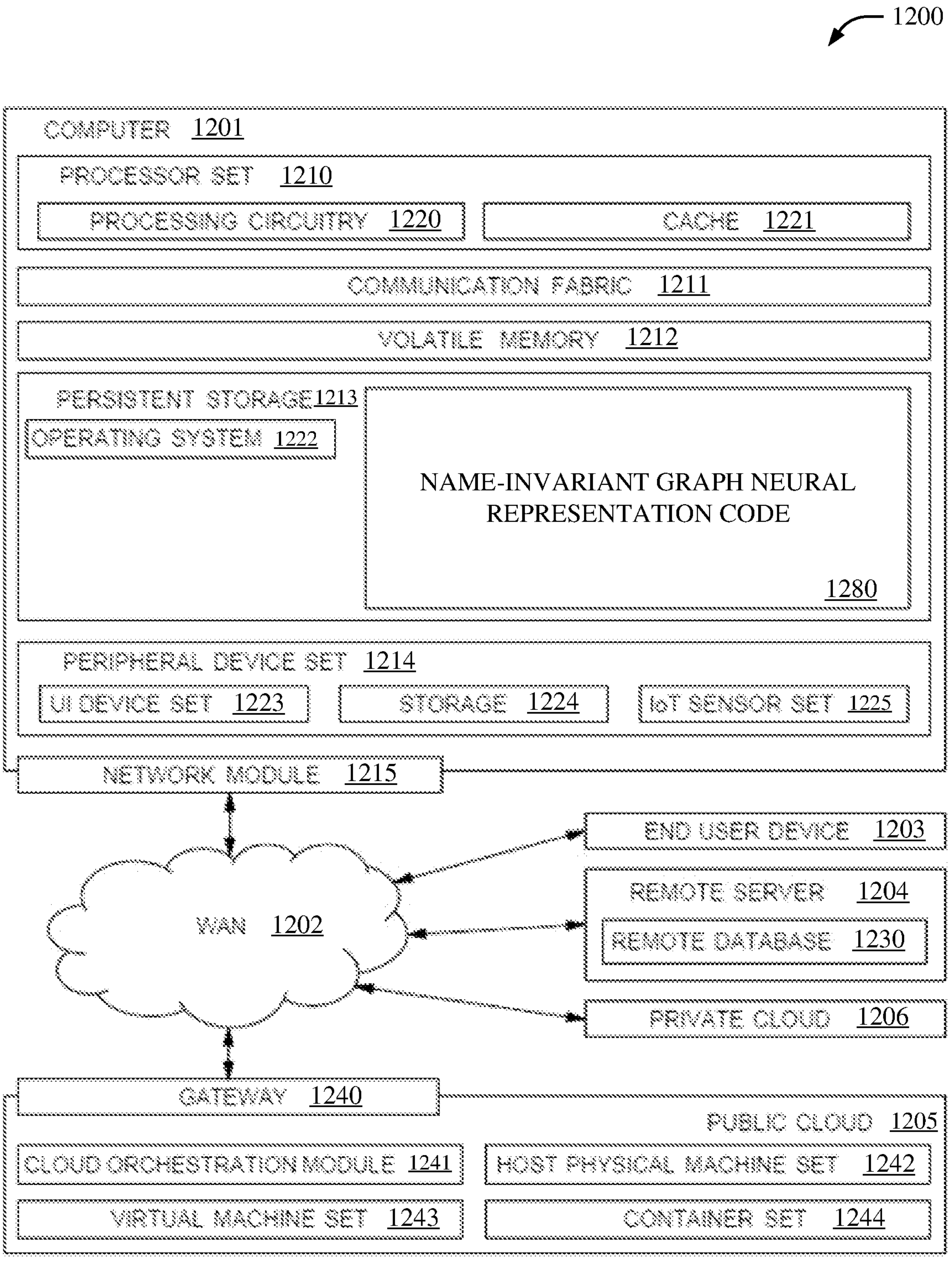
FIG. 12 illustrates a block diagram of an example, non-limiting operating environment in which one or more embodiments described herein can be facilitated.

FIG. 12 and the following discussion are intended to provide a brief, general description of a suitable computing environment 1200 in which one or more embodiments described herein can be implemented. For example, various aspects of the present disclosure are described by narrative text, flowcharts, block diagrams of computer systems or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks can be performed in reverse order, as a single integrated step, concurrently or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions or data for performing computer operations specified in a given CPP claim. A "storage device" is any tangible device that can retain and store instructions for use by a computer processor. Without limitation, the computer readable storage medium can be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 1200 contains an example of an environment for the execution of at least some of the computer code involved in performing the inventive methods, such as name-invariant graph neural representation code 1280. In addition to block 1280, computing environment 1200 includes, for example, computer 1201, wide area network (WAN) 1202, end user device (EUD) 1203, remote server 1204, public cloud 1205, and private cloud 1206. In this embodiment, computer 1201 includes processor set 1210 (including processing circuitry 1220 and cache 1221), communication fabric 1211, volatile memory 1212, persistent storage 1213 (including operating system 1222 and block 1280, as identified above), peripheral device set 1214 (including user interface (UI), device set 1223, storage 1224, and Internet of Things (IoT) sensor set 1225), and network module 1215. Remote server 1204 includes remote database 1230. Public cloud 1205 includes gateway 1240, cloud orchestration module 1241, host physical machine set 1242, virtual machine set 1243, and container set 1244.

COMPUTER 1201 can take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1230. As is well understood in the art of computer technology, and depending upon the technology, performance of a computer-implemented method can be distributed among multiple computers or between multiple locations. On the other hand, in this presentation of computing environment 1200, detailed discussion is focused on a single computer, specifically computer 1201, to keep the presentation as simple as possible. Computer 1201 can be located in a cloud, even though it is not shown in a cloud in FIG. 12. On the other hand, computer 1201 is not required to be in a cloud except to any extent as can be affirmatively indicated.

PROCESSOR SET 1210 includes one, or more, computer processors of any type now known or to be developed in the future. Processing circuitry 1220 can be distributed over multiple packages, for example, multiple, coordinated integrated circuit chips. Processing circuitry 1220 can implement multiple processor threads or multiple processor cores. Cache 1221 is memory that is located in the processor chip package(s) and is typically used for data or code that should be available for rapid access by the threads or cores running on processor set 1210. Cache memories are typically organized into multiple levels depending upon relative proximity to the processing circuitry. Alternatively, some, or all, of the cache for the processor set can be located "off chip." In some computing environments, processor set 1210 can be designed for working with qubits and performing quantum computing.

Computer readable program instructions are typically loaded onto computer 1201 to cause a series of operational steps to be performed by processor set 1210 of computer 1201 and thereby effect a computer-implemented method, such that the instructions thus executed will instantiate the methods specified in flowcharts or narrative descriptions of computer-implemented methods included in this document (collectively referred to as "the inventive methods"). These computer readable program instructions are stored in various types of computer readable storage media, such as cache 1221 and the other storage media discussed below. The program instructions, and associated data, are accessed by processor set 1210 to control and direct performance of the inventive methods. In computing environment 1200, at least some of the instructions for performing the inventive methods can be stored in block 1280 in persistent storage 1213.

COMMUNICATION FABRIC 1211 is the signal conduction path that allows the various components of computer 1201 to communicate with each other. Typically, this fabric is made of switches and electrically conductive paths, such as the switches and electrically conductive paths that make up busses, bridges, physical input/output ports and the like. Other types of signal communication paths can be used, such as fiber optic communication paths or wireless communication paths.

VOLATILE MEMORY 1212 is any type of volatile memory now known or to be developed in the future. Examples include dynamic type random access memory (RAM) or static type RAM. Typically, the volatile memory is characterized by random access, but this is not required unless affirmatively indicated. In computer 1201, the volatile memory 1212 is located in a single package and is internal to computer 1201, but, alternatively or additionally, the volatile memory can be distributed over multiple packages or located externally with respect to computer 1201.

PERSISTENT STORAGE 1213 is any form of non-volatile storage for computers that is now known or to be developed in the future. The non-volatility of this storage means that the stored data is maintained regardless of whether power is being supplied to computer 1201 or directly to persistent storage 1213. Persistent storage 1213 can be a read only memory (ROM), but typically at least a portion of the persistent storage allows writing of data, deletion of data and re-writing of data. Some familiar forms of persistent storage include magnetic disks and solid-state storage devices. Operating system 1222 can take several forms, such as various known proprietary operating systems or open-source Portable Operating System Interface type operating systems that employ a kernel. The code included in block 1280 typically includes at least some of the computer code involved in performing the inventive methods.

PERIPHERAL DEVICE SET 1214 includes the set of peripheral devices of computer 1201. Data communication connections between the peripheral devices and the other components of computer 1201 can be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 1223 can include components such as a display screen, speaker, microphone, wearable devices (such as goggles and smart watches), keyboard, mouse, printer, touchpad, game controllers, and haptic devices. Storage 1224 is external storage, such as an external hard drive, or insertable storage, such as an SD card. Storage 1224 can be persistent or volatile. In some embodiments, storage 1224 can take the form of a quantum computing storage device for storing data in the form of qubits. In embodiments where computer 1201 is required to have a large amount of storage (for example, where computer 1201 locally stores and manages a large database) then this storage can be provided by peripheral storage devices designed for storing large amounts of data, such as a storage area network (SAN) that is shared by multiple, geographically distributed computers. IoT sensor set 1225 is made up of sensors that can be used in Internet of Things applications. For example, one sensor can be a thermometer and another sensor can be a motion detector.

NETWORK MODULE 1215 is the collection of computer software, hardware, and firmware that allows computer 1201 to communicate with other computers through WAN 1202. Network module 1215 can include hardware, such as modems or Wi-Fi signal transceivers, software for packetizing or de-packetizing data for communication network transmission, or web browser software for communicating data over the internet. In some embodiments, network control functions and network forwarding functions of network module 1215 are performed on the same physical hardware device. In other embodiments (for example, embodiments that utilize software-defined networking (SDN)), the control functions and the forwarding functions of network module 1215 are performed on physically separate devices, such that the control functions manage several different network hardware devices. Computer readable program instructions for performing the inventive methods can typically be downloaded to computer 1201 from an external computer or external storage device through a network adapter card or network interface included in network module 1215.

WAN 1202 is any wide area network (for example, the internet) capable of communicating computer data over non-local distances by any technology for communicating computer data, now known or to be developed in the future. In some embodiments, the WAN can be replaced or supplemented by local area networks (LANs) designed to communicate data between devices located in a local area, such as a Wi-Fi network. The WAN or LANs typically include computer hardware such as copper transmission cables, optical transmission fibers, wireless transmission, routers, firewalls, switches, gateway computers and edge servers.

END USER DEVICE (EUD) 1203 is any computer system that is used and controlled by an end user (for example, a customer of an enterprise that operates computer 1201) and can take any of the forms discussed above in connection with computer 1201. EUD 1203 typically receives helpful and useful data from the operations of computer 1201. For example, in a hypothetical case where computer 1201 is designed to provide a recommendation to an end user, this recommendation would typically be communicated from network module 1215 of computer 1201 through WAN 1202 to EUD 1203. In this way, EUD 1203 can display, or otherwise present, the recommendation to an end user. In some embodiments, EUD 1203 can be a client device, such as thin client, heavy client, mainframe computer or desktop computer.

REMOTE SERVER 1204 is any computer system that serves at least some data or functionality to computer 1201. Remote server 1204 can be controlled and used by the same entity that operates computer 1201. Remote server 1204 represents the machine(s) that collect and store helpful and useful data for use by other computers, such as computer 1201. For example, in a hypothetical case where computer 1201 is designed and programmed to provide a recommendation based on historical data, then this historical data can be provided to computer 1201 from remote database 1230 of remote server 1204.

PUBLIC CLOUD 1205 is any computer system available for use by multiple entities that provides on-demand availability of computer system resources or other computer capabilities, especially data storage (cloud storage) and computing power, without direct active management by the scale. The direct and active management of the computing resources of public cloud 1205 is performed by the computer hardware or software of cloud orchestration module 1241. The computing resources provided by public cloud 1205 are typically implemented by virtual computing environments that run on various computers making up the computers of host physical machine set 1242, which is the universe of physical computers in or available to public cloud 1205. The virtual computing environments (VCEs) typically take the form of virtual machines from virtual machine set 1243 or containers from container set 1244. It is understood that these VCEs can be stored as images and can be transferred among and between the various physical machine hosts, either as images or after instantiation of the VCE. Cloud orchestration module 1241 manages the transfer and storage of images, deploys new instantiations of VCEs and manages active instantiations of VCE deployments. Gateway 1240 is the collection of computer software, hardware and firmware allowing public cloud 1205 to communicate through WAN 1202.

Some further explanation of virtualized computing environments (VCEs) will now be provided. VCEs can be stored as “images.” A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1206 is similar to public cloud 1205, except that the computing resources are only available for use by a single enterprise. While private cloud 1206 is depicted as being in communication with WAN 1202, in other embodiments a private cloud can be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, or data/application portability between the multiple constituent clouds. In this embodiment, public cloud 1205 and private cloud 1206 are both part of a larger hybrid cloud.

The embodiments described herein can be directed to one or more of a system, a method, an apparatus or a computer program product at any possible technical detail level of integration. The computer program product can include a computer readable storage medium (or media) having computer readable program instructions thereon for causing a processor to carry out aspects of the one or more embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a superconducting storage device or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network or a wireless network. The network can comprise copper transmission cables, optical transmission fibers, wireless transmission, routers, firewalls, switches, gateway computers or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry, or source code or object code written in any combination of one or more programming languages, including an object oriented programming language such as Smalltalk, C++ or the like, or procedural programming languages, such as the "C" programming language or similar programming languages. The computer readable program instructions can execute entirely on a computer, partly on a computer, as a stand-alone software package, partly on a computer or partly on a remote computer or entirely on the remote computer or server. In the latter scenario, the remote computer can be connected to a computer through any type of network, including a local area network (LAN) or a wide area network (WAN), or the connection can be made to an external computer (for example, through the Internet using an Internet Service Provider). In one or more embodiments, electronic circuitry including, for example, programmable logic circuitry, field-programmable gate arrays (FPGA) or programmable logic arrays (PLA) can execute the computer readable program instructions by utilizing state information of the computer readable program instructions to personalize the electronic circuitry, in order to perform aspects of the one or more embodiments described herein.

Aspects of the one or more embodiments described herein are described with reference to flowchart illustrations or block diagrams of methods, apparatus (systems), and computer program products according to one or more embodiments described herein. It will be understood that each block of the flowchart illustrations or block diagrams, and combinations of blocks in the flowchart illustrations or block diagrams, can be implemented by computer readable program instructions. These computer readable program instructions can be provided to a processor of a general-purpose computer, special purpose computer or other programmable data processing apparatus to produce a machine, such that the instructions, which execute via the processor of the computer or other programmable data processing apparatus, can create means for implementing the functions/acts specified in the flowchart or block diagram block or blocks. These computer readable program instructions can also be stored in a computer readable storage medium that can direct a computer, a programmable data processing apparatus or other devices to function in a particular manner, such that the computer readable storage medium having instructions stored therein can comprise an article of manufacture including instructions which can implement aspects of the function/act specified in the flowchart or block diagram block or blocks. The computer readable program instructions can also be loaded onto a computer, other programmable data processing apparatus or other device to cause a series of operational acts to be performed on the computer, other programmable apparatus or other device to produce a computer implemented process, such that the instructions which execute on the computer, other programmable apparatus or other device implement the functions/acts specified in the flowchart or block diagram block or blocks.

The flowcharts and block diagrams in the figures illustrate the architecture, functionality or operation of possible implementations of systems, computer-implementable methods or computer program products according to one or more embodiments described herein. In this regard, each block in the flowchart or block diagrams can represent a module, segment or portion of instructions, which comprises one or more executable instructions for implementing the specified logical function. In one or more alternative implementations, the functions noted in the blocks can occur out of the order noted in the Figures. For example, two blocks shown in succession can be executed substantially concurrently, or the blocks can sometimes be executed in the reverse order, depending upon the functionality involved. It will also be noted that each block of the block diagrams or flowchart illustration, or combinations of blocks in the block diagrams or flowchart illustration, can be implemented by special purpose hardware-based systems that can perform the specified functions or acts or carry out one or more combinations of special purpose hardware or computer instructions.

While the subject matter has been described above in the general context of computer-executable instructions of a computer program product that runs on a computer or computers, those skilled in the art will recognize that the one or more embodiments herein also can be implemented at least partially in parallel with one or more other program modules. Generally, program modules include routines, programs, components or data structures that perform particular tasks or implement particular abstract data types. Moreover, the aforedescribed computer-implemented methods can be practiced with other computer system configurations, including single-processor or multiprocessor computer systems, mini-computing devices, mainframe computers, as well as computers, hand-held computing devices (e.g., PDA, phone), or microprocessor-based or programmable consumer or industrial electronics. The illustrated aspects can also be practiced in distributed computing environments in which tasks are performed by remote processing devices that are linked through a communications network. However, one or more, if not all aspects of the one or more embodiments described herein can be practiced on stand-alone computers. In a distributed computing environment, program modules can be located in both local and remote memory storage devices.

As used in this application, the terms "component," "system," "platform" or "interface" can refer to or can include a computer-related entity or an entity related to an operational machine with one or more specific functionalities. The entities described herein can be either hardware, a combination of hardware and software, software, or software in execution. For example, a component can be, but is not limited to being, a process running on a processor, a processor, an object, an executable, a thread of execution, a program or a computer. By way of illustration, both an application running on a server and the server can be a component. One or more components can reside within a process or thread of execution and a component can be localized on one computer or distributed between two or more computers. In another example, respective components can execute from various computer readable media having various data structures stored thereon. The components can communicate via local or remote processes such as in accordance with a signal having one or more data packets (e.g., data from one component interacting with another component in a local system, distributed system or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, where the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. As used herein, the term "and/or" is intended to have the same meaning as "or." Moreover, articles "a" and "an" as used in the subject specification and annexed drawings should generally be construed to mean "one or more" unless specified otherwise or clear from context to be directed to a singular form. As used herein, the terms "example" or "exemplary" are utilized to mean serving as an example, instance, or illustration. For the avoidance of doubt, the subject matter described herein is not limited by such examples. In addition, any aspect or design described herein as an "example" or "exemplary" is not necessarily to be construed as preferred or advantageous over other aspects or designs, nor is it meant to preclude equivalent exemplary structures and techniques known to those of ordinary skill in the art.

The herein disclosure describes non-limiting examples of various embodiments. For ease of description or explanation, various portions of the herein disclosure utilize the term "each", "every", or "all" when discussing various embodiments. Such usages of the term "each", "every", or "all" are non-limiting examples. In other words, when the herein disclosure provides a description that is applied to "each", "every", or "all" of some particular object or component, it should be understood that this is a non-limiting example of various embodiments, and it should be further understood that, in various other embodiments, it can be the case that such description applies to fewer than "each", "every", or "all" of that particular object or component.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; or parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches or gates, in order to optimize space usage or to enhance performance of related equipment. A processor can be implemented as a combination of computing processing units.

Herein, terms such as "store," "storage," "data store," data storage," "database," and substantially any other information storage component relevant to operation and functionality of a component are utilized to refer to "memory components," entities embodied in a "memory," or components comprising a memory. Memory or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory or nonvolatile random-access memory (RAM) (e.g., ferroelectric RAM (FeRAM). Volatile memory can include RAM, which can act as external cache memory, for example. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM) or Rambus dynamic RAM (RDRAM). Also, the described memory components of systems or computer-implemented methods herein are intended to include, without being limited to including, these or any other suitable types of memory.

What has been described above includes mere examples of systems and computer-implemented methods. It is, of course, not possible to describe every conceivable combination of components or computer-implemented methods for purposes of describing the one or more embodiments, but one of ordinary skill in the art can recognize that many further combinations or permutations of the one or more embodiments are possible. Furthermore, to the extent that the terms "includes," "has," "possesses," and the like are used in the detailed description, claims, appendices or drawings such terms are intended to be inclusive in a manner similar to the term "comprising" as "comprising" is interpreted when employed as a transitional word in a claim.

The descriptions of the various embodiments have been presented for purposes of illustration but are not intended to be exhaustive or limited to the embodiments described herein. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A system, comprising:

a processor that executes computer-executable components stored in a non-transitory computer-readable memory, the computer-executable components comprising:

an access component that accesses a set of first directed acyclic graphs respectively representing a conjecture and a set of axioms; and a proof component that generates, via execution of at least one neural-guided automated theorem prover that independently processes the set of first directed acyclic graphs, a proof for the conjecture, wherein the at least one neural-guided automated theorem prover leverages, for a node representing a non-logical symbol name present in more than one of the set of first directed acyclic graphs, a name-invariant learned embedding based on a second directed acyclic graph that is an aggregation of the set of first directed acyclic graphs.

2. The system of claim 1, wherein the computer-executable components further comprise:

an aggregation component that generates the second directed acyclic graph, by combining the set of first directed acyclic graphs via a conjunction, and by collapsing together repeated instances of the node representing the non-logical symbol name.

3. The system of claim 2, wherein the computer-executable components further comprise:

an embedding component that feeds the second directed acyclic graph and random embeddings respectively corresponding to nodes of the second directed acyclic graph as input to a graph neural network, wherein the graph neural network produces as output first learned embeddings respectively corresponding to the nodes of the second directed acyclic graph, and wherein the name-invariant learned embedding is whichever of the first learned embeddings corresponds to the node representing the non-logical symbol name.

4. The system of claim 3, wherein, during independent processing of any of the set of first directed acyclic graphs in which the node representing the non-logical symbol name is present, the at least one neural-guided automated theorem prover uses, as an initial embedding for the node representing the non-logical symbol name, the name-invariant learned embedding instead of a random embedding.

5. The system of claim 1, wherein the at least one neural-guided automated theorem prover comprises an ensemble of neural-guided automated theorem provers, each of which is set to a distinct proof configuration.

6. The system of claim 1, wherein the non-logical symbol name is a name of a constant, of a function, or of a predicate that is present in the conjecture or in the set of axioms.

7. The system of claim 1, wherein the computer-executable components comprise:

a result component that visually renders the proof on an electronic display.

8. A computer-implemented method, comprising:

accessing, by a device operatively coupled to a processor, a set of first directed acyclic graphs respectively representing a conjecture and a set of axioms; and generating, by the device and via execution of at least one neural-guided automated theorem prover that independently processes the set of first directed acyclic graphs, a proof for the conjecture, wherein the at least one neural-guided automated theorem prover leverages, for a node representing a non-logical symbol name present in more than one of the set of first directed acyclic graphs, a name-invariant learned embedding based on a second directed acyclic graph that is an aggregation of the set of first directed acyclic graphs.

9. The computer-implemented method of claim 8, further comprising:

generating, by the device, the second directed acyclic graph, by combining the set of first directed acyclic graphs via a conjunction, and by collapsing together repeated instances of the node representing the non-logical symbol name.

10. The computer-implemented method of claim 9, further comprising:

feeding, by the device, the second directed acyclic graph and random embeddings respectively corresponding to nodes of the second directed acyclic graph as input to a graph neural network, wherein the graph neural network produces as output first learned embeddings respectively corresponding to the nodes of the second directed acyclic graph, and wherein the name-invariant learned embedding is whichever of the first learned embeddings corresponds to the node representing the non-logical symbol name.

11. The computer-implemented method of claim 10, wherein, during independent processing of any of the set of first directed acyclic graphs in which the node representing the non-logical symbol name is present, the at least one neural-guided automated theorem prover uses, as an initial embedding for the node representing the non-logical symbol name, the name-invariant learned embedding instead of a random embedding.

12. The computer-implemented method of claim 8, wherein the at least one neural-guided automated theorem prover comprises an ensemble of neural-guided automated theorem provers, each of which is set to a unique proof configuration.

13. The computer-implemented method of claim 8, wherein the non-logical symbol name is a name of a constant, of a function, or of a predicate that is present in the conjecture or in the set of axioms.

14. The computer-implemented method of claim 8, further comprising:

visually rendering, by the device, the proof on an electronic display.

15. A computer program product for facilitating name-invariant graph neural representations for automated theorem proving, the computer program product comprising a non-transitory computer-readable memory having program instructions embodied therewith, the program instructions executable by a processor to cause the processor to:

access a set of first directed acyclic graphs respectively representing a conjecture and a set of axioms; and generate, via execution of at least one neural-guided automated theorem prover that independently processes the set of first directed acyclic graphs, a proof for the conjecture, wherein the at least one neural-guided automated theorem prover leverages, for a node representing a non-logical symbol name present in more than one of the set of first directed acyclic graphs, a name-invariant learned embedding based on a second directed acyclic graph that is an aggregation of the set of first directed acyclic graphs.

16. The computer program product of claim 15, wherein the program instructions are further executable to cause the processor to:

generate the second directed acyclic graph, by combining the set of first directed acyclic graphs via a conjunction, and by collapsing together repeated instances of the node representing the non-logical symbol name.

17. The computer program product of claim 16, wherein the program instructions are further executable to cause the processor to:

feed the second directed acyclic graph and random embeddings respectively corresponding to nodes of the second directed acyclic graph as input to a graph neural network, wherein the graph neural network produces as output first learned embeddings respectively corresponding to the nodes of the second directed acyclic graph, and wherein the name-invariant learned embedding is whichever of the first learned embeddings corresponds to the node representing the non-logical symbol name.

18. The computer program product of claim 17, wherein, during independent processing of any of the set of first directed acyclic graphs in which the node representing the non-logical symbol name is present, the at least one neural-guided automated theorem prover uses, as an initial embedding for the node representing the non-logical symbol name, the name-invariant learned embedding instead of a random embedding.

19. The computer program product of claim 15, wherein the at least one neural-guided automated theorem prover comprises an ensemble of neural-guided automated theorem provers, each of which is set to a unique proof configuration.

20. The computer program product of claim 15, wherein the non-logical symbol name is a name of a constant, of a function, or of a predicate that is present in the conjecture or in the set of axioms.

* * * * *